United States Patent
Xu et al.

(10) Patent No.: US 11,778,217 B2
(45) Date of Patent: Oct. 3, 2023

(54) HIGH LEVEL SYNTAX CONTROL FOR SCREEN CONTENT CODING

(71) Applicant: Tencent America LLC, Palo Alto, CA (US)

(72) Inventors: Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/477,151

(22) Filed: Sep. 16, 2021

(65) Prior Publication Data

US 2022/0279196 A1     Sep. 1, 2022

Related U.S. Application Data

(60) Provisional application No. 63/152,178, filed on Feb. 22, 2021.

(51) Int. Cl.
| | | |
|---|---|---|
| *H04N 19/44* | (2014.01) | |
| *H04N 19/176* | (2014.01) | |
| *H04N 19/189* | (2014.01) | |
| *H04N 19/46* | (2014.01) | |

(52) U.S. Cl.
CPC ........... *H04N 19/44* (2014.11); *H04N 19/176* (2014.11); *H04N 19/189* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 2014/0023142 A1 | 1/2014 | Yu et al. | |
| 2016/0057430 A1* | 2/2016 | Kolesnikov | H04N 19/103 |
| | | | 375/240.12 |
| 2016/0373756 A1 | 12/2016 | Yu et al. | |
| 2018/0262760 A1* | 9/2018 | Zhang | H04N 19/136 |
| 2018/0278952 A1* | 9/2018 | Han | H04N 19/136 |
| 2020/0396467 A1 | 12/2020 | Lai et al. | |
| 2021/0021841 A1 | 1/2021 | Xu et al. | |

(Continued)

OTHER PUBLICATIONS

International Search Report and Written Opinion dated Dec. 23, 2021 in PCT/US 21/52065. 15 pages.

(Continued)

*Primary Examiner* — Chikaodili E Anyikire
(74) *Attorney, Agent, or Firm* — ARENTFOX SCHIFF LLP

(57) ABSTRACT

Aspects of the disclosure provide a method and an apparatus including processing circuitry for video decoding. The processing circuitry can decode coding information for a plurality of blocks from a coded video bitstream. The coding information can indicate a high-level control flag for the plurality of blocks. The high-level control flag can indicate whether a plurality of coding tools is disabled for at least one of the plurality of blocks where at least one of the plurality of blocks includes a current block. The processing circuitry can determine whether the plurality of coding tools is disabled for the at least one of the plurality of blocks based on the high-level control flag. The processing circuitry can reconstruct the current block without the plurality of coding tools based on the plurality of coding tools being determined as disabled.

20 Claims, 24 Drawing Sheets

(56) References Cited

U.S. PATENT DOCUMENTS

| | | | |
|---|---|---|---|
| 2022/0046272 A1* | 2/2022 | Zhang | H04N 19/139 |
| 2022/0078427 A1* | 3/2022 | Zhu | H04N 19/176 |
| 2022/0264124 A1* | 8/2022 | Deng | H04N 19/157 |

OTHER PUBLICATIONS

Xiaozhong Xu et al., AHG 9: On conditioning the presence of inter-/intra-related syntax elements in PH, Document JVET-Q0781-v1, Jan. 7-17, 2020, 3 pages Text changes (based on JVET-Q0041-v2_DraftText.docx), to reflect the notes during meeting discussion, 4 pages.

Benjamin Bross et al., Versatile Video Coding (Draft 10); Document: JVET-S2001-vH; Jun. 22-Jul. 1, 2020; 313 pages.

\* cited by examiner

FIG. 12D

| | |
|---|---|
| …… | |
| if (profile_id == 0x30 \|\| profile_id == 0x32) { | |
|   if (UmveEnableFlag) { | |
|     umve_enh_enable_flag | u(1) |
|   } | |
|   interpf_enable_flag | u(1) |
|   ist_enable_flag | u(1) |
|   ists_enable_flag | u(1) |
|   ts_inter_enable_flag | u(1) |
|   if (SecondaryTransformEnableFlag) { | |
|     est_enable_flag | u(1) |
|     st_chroma_enable_flag | u(1) |
|   } | |
|   srcc_enable_flag | u(1) |
|   ibc_enable_flag | u(1) |
|   if (IbcEnableFlag) { | |
|     abvr_enable_flag | u(1) |
|     sibc_enable_flag | u(1) |
|   } | |
|   isc_enable_flag | u(4) |
|   num_of_intra_hmvp_cand | u(4) |
|   fimc_enable_flag | u(1) |
|   eipm_enable_flag | u(1) |
|   sbt_enable_flag | u(1) |
|   dmvr_enable_flag | u(1) |
|   bio_enable_flag | u(1) |
|   big_enable_flag | u(1) |
|   mvap_enable_flag | u(1) |
|   if (TscpmEnableFlag) { | |
|     enhanced_tscpm_enable_flag | u(1) |
|   } | |
|   pmc_enable_flag | u(1) |
|   iip_enable_flag | u(1) |
|   if (IpfEnableFlag) { | |
|     ipf_chroma_enable_flag | u(1) |
|   } | |
|   if (AffineEnableFlag && UmveEnableFlag) { | |
|     affine_umve_enable_flag | u(1) |
|   } | |

*FIG. 15A*

Continued from FIG. 15A

1500

| | |
|---|---|
| if (AffineEnableFlag) { | |
|     sp_enable_flag | u(1) |
| } | |
| mipf_enable_flag | u(1) |
| loop_filter_type_enable_flag | u(1) |
| awp_enable_flag | u(1) |
| if (AwpEnableFlag) { | |
|     awp_mvr_enable_flag | u(1) |
| } | |
| enhanced_sample_adaptive_offset_enable_flag | u(1) |
| cross_component_sample_adaptive_offset_enable_flag | u(1) |
| if (EsaoEnableFlag) { | |
|     SaoEnableFlag == 0 | |
| } | |
| etmvp_enable_flag | u(1) |
| subtmvp_enable_flag | u(1) |
| if (AlfEnableFlag) { | |
|     ealf_enable_flag | u(1) |
| } | |
| dbr_enable_flag | u(1) |
| } | |

FIG. 15B

| | |
|---|---|
| ...... | |
| if (profile_id == 0x30 \|\| profile_id == 0x32) { | |
|     scc_only_enable_flag | u(1) |
|     if (!SccOnlyEnableFlag) { | |
|         eipm_enable_flag | u(1) |
|         dmvr_enable_flag | u(1) |
|         bio_enable_flag | u(1) |
|         if (AffineEnableFlag && UmveEnableFlag) { | |
|             affine_umve_enable_flag | u(1) |
|         } | |
|         etmvp_enable_flag | u(1) |
|         subtmvp_enable_flag | u(1) |
|         if (SecondaryTransformEnableFlag) { | |
|             st_chroma_enable_flag | u(1) |
|         } | |
|         if (IpfEnableFlag) { | |
|             ipf_chroma_enable_flag | u(1) |
|         } | |
|         if (AlfEnableFlag) { | |
|             ealf_enable_flag | u(1) |
|         } | |
|         if (AffineEnableFlag) { | |
|             sp_enable_flag | u(1) |
|         } | |
|         iip_enable_flag | u(1) |
|     } /* end if (!SccOnlyEnableFlag) */ | |
|     ...... | |
| } /* end if (profile_id == 0x30 \|\| profile_id == 0x32) */ | |
| ...... | |

FIG. 16

| | |
|---|---|
| if (EipmEnableFlag && IntraLumaPedModeIndex > 1) { | |
| eipm_pu_flag | u(1) |
| } | |

FIG. 17A

| | |
|---|---|
| if (EipmEnableFlag && !SccOnlyEnableFlag && IntraLumaPedModeIndex > 1) { | |
| eipm_pu_flag | u(1) |
| } | |

FIG. 17B

HIGH LEVEL SYNTAX CONTROL FOR SCREEN CONTENT CODING

INCORPORATION BY REFERENCE

This present application claims the benefit of priority to U.S. Provisional Application No. 63/152,178, "High level syntax control for Screen Content Coding" filed on Feb. 22, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labeled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labeled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and/or decoding. In some examples, an apparatus for video decoding includes processing circuitry. The processing circuitry can decode coding information for a plurality of blocks from a coded video bitstream. The coding information can indicate a high-level control flag for the plurality of blocks. The high-level control flag can indicate whether a plurality of coding tools is disabled for at least one of the plurality of blocks. The at least one of the plurality of blocks can include a current block. The processing circuitry can determine whether the plurality of coding tools is disabled for the at least one of the plurality of blocks based on the high-level control flag and reconstruct the current block without the plurality of coding tools based on the plurality of coding tools being determined as disabled.

In an embodiment, the high-level control flag indicates that the plurality of coding tools is disabled for the at least one of the plurality of blocks. The processing circuitry determines that the plurality of coding tools is disabled for the at least one of the plurality of blocks.

In an embodiment, the high-level control flag indicates that the plurality of coding tools is allowable for the at least one of the plurality of blocks. The processing circuitry can determine, for each of the plurality of coding tools, whether the coding tool is allowed for the at least one of the plurality of blocks based on a respective indicator for the coding tool.

In an embodiment, the plurality of coding tools includes camera-captured content coding tools that are different from screen content coding (SCC) tools. The high-level control flag being a first value indicates that only the SCC tools are allowable for the at least one of the plurality of coding blocks and the camera-captured content coding tools are disabled for the at least one of the plurality of coding blocks. The high-level control flag being a second value indicates that the camera-captured content coding tools and the SCC tools are allowable for the at least one of the plurality of coding blocks.

In an embodiment, the processing circuitry can determine, based on the high-level control flag, a respective indicator for each of the plurality of coding tools that indicates whether the respective coding tool is allowable for the at least one of the plurality of blocks.

In an example, the respective indicator is a variable. The processing circuitry can determine, for each of the plurality of coding tools, the respective variable based on the high-level control flag and a respective enabling flag for the respective coding tool, the respective enabling flag being for the at least one of the plurality of blocks.

In an example, the respective indicator for each of the plurality of coding tools is set to a value of 0 indicating that the respective coding tool is disabled for the at least one of the plurality of blocks based on the high-level control flag indicating that the plurality of coding tools is disabled for the at least one of the plurality of blocks.

In an example, the high-level control flag is indicated in a sequence parameter set (SPS) or a picture header. The respective indicator for each of the plurality of coding tools is for a current picture that includes the at least one of the plurality of blocks.

In an embodiment, the high-level control flag is signaled in a sequence parameter set (SPS) for a video sequence and indicates whether the plurality of coding tools is disabled for the plurality of blocks in the video sequence. The processing circuitry can determine that the plurality of coding tools is disabled for the plurality of blocks in the video sequence based on the high-level control flag indicating that the plurality of coding tools is disabled for the plurality of blocks in the video sequence.

In an embodiment, the high-level control flag is signaled in a picture header for a current picture and indicates whether the plurality of coding tools is disabled for the plurality of blocks in the current picture. The processing circuitry can determine that the plurality of coding tools is disabled for the plurality of blocks in the current picture based on the high-level control flag indicating that the plurality of coding tools is disabled for the plurality of blocks in the current picture.

In an embodiment, the high-level control flag is indicated in a sequence parameter set (SPS) or a picture header. The at least one of the plurality of blocks is the current block.

In an example, the processing circuitry determines, based on the high-level control flag, whether to signal a respective block-level enabling flag for each of the plurality of coding tools that indicates whether the coding tool is allowable for the current block.

In an example, the high-level control flag is signaled in one of a sequence parameter set (SPS), a picture parameter set (PPS), a picture header, a slice header, a tile group level, and a tile level.

Aspects of the disclosure provide non-transitory computer-readable mediums storing instructions which when executed by a computer for video decoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIGS. 12A-12D show examples of intra block copy according to an embodiment of the disclosure.

FIGS. 15A-15B show an exemplary syntax table (1500) according to an embodiment of the disclosure.

FIG. 16 shows a syntax table in a sequence parameter set (SPS) according to an embodiment of the disclosure.

FIGS. 17A-17B show exemplary syntax for a block-level flag according to embodiments of the disclosure.

DETAILED DESCRIPTION OF EMBODIMENTS

Figure 3:
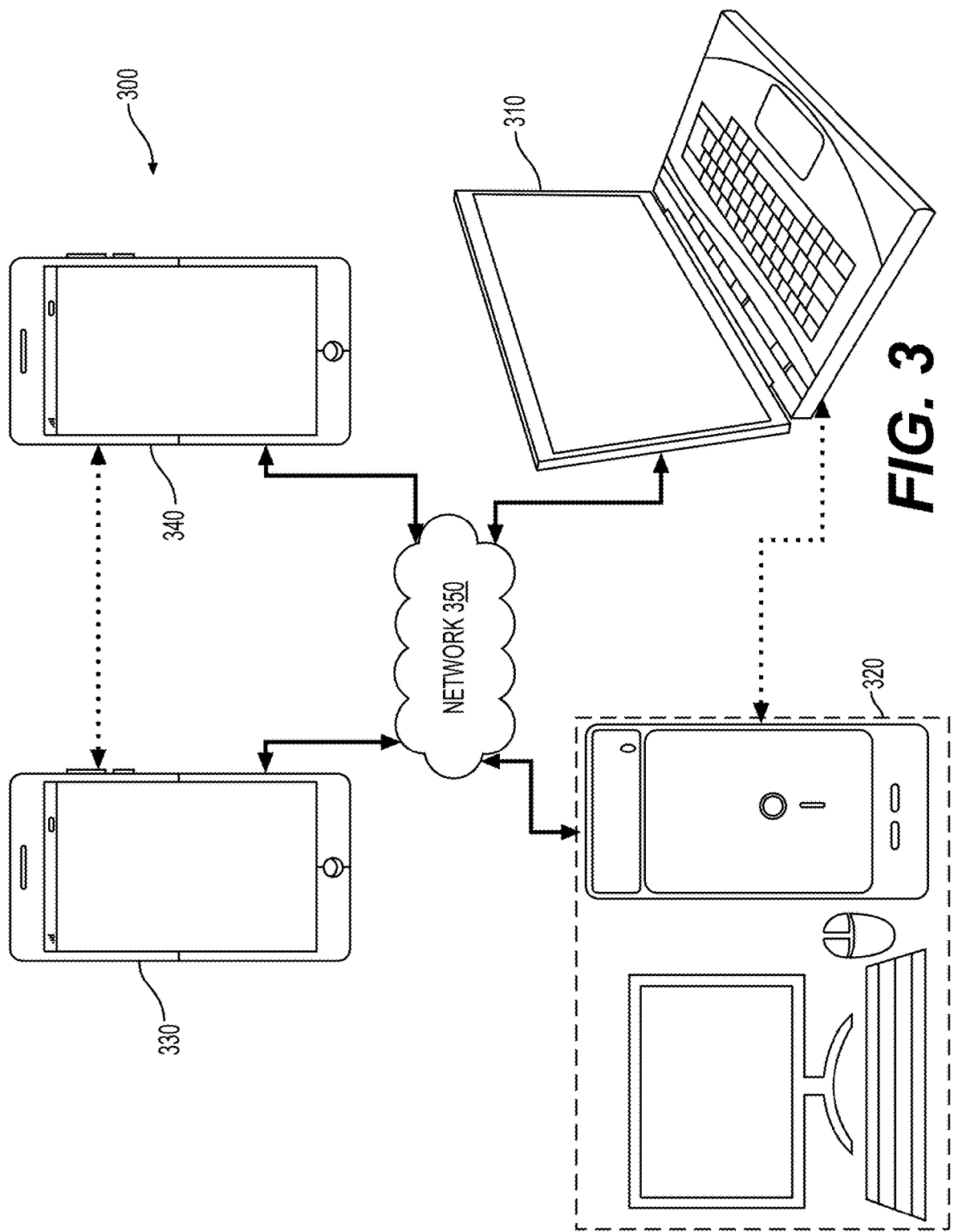
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wire line (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
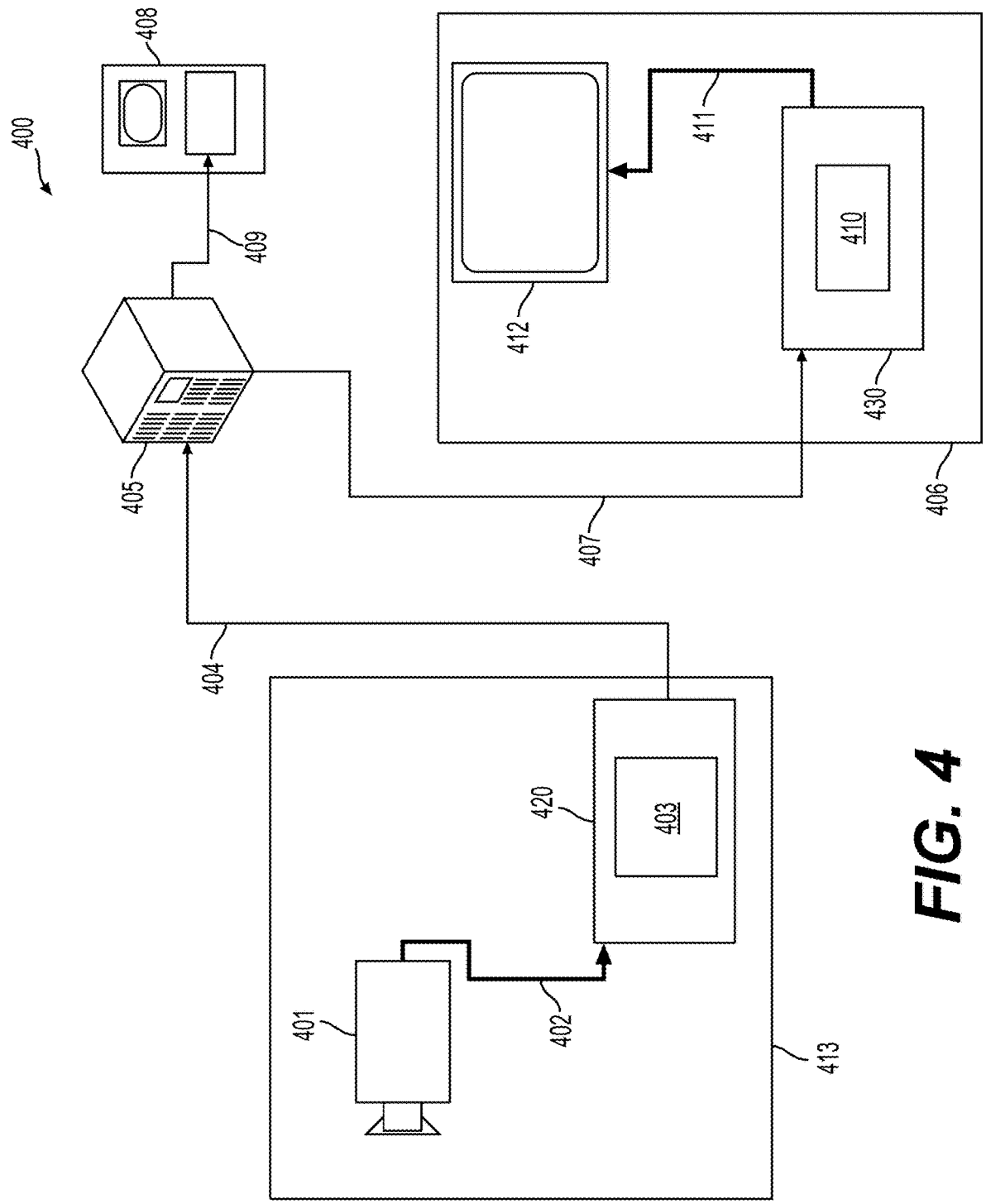
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
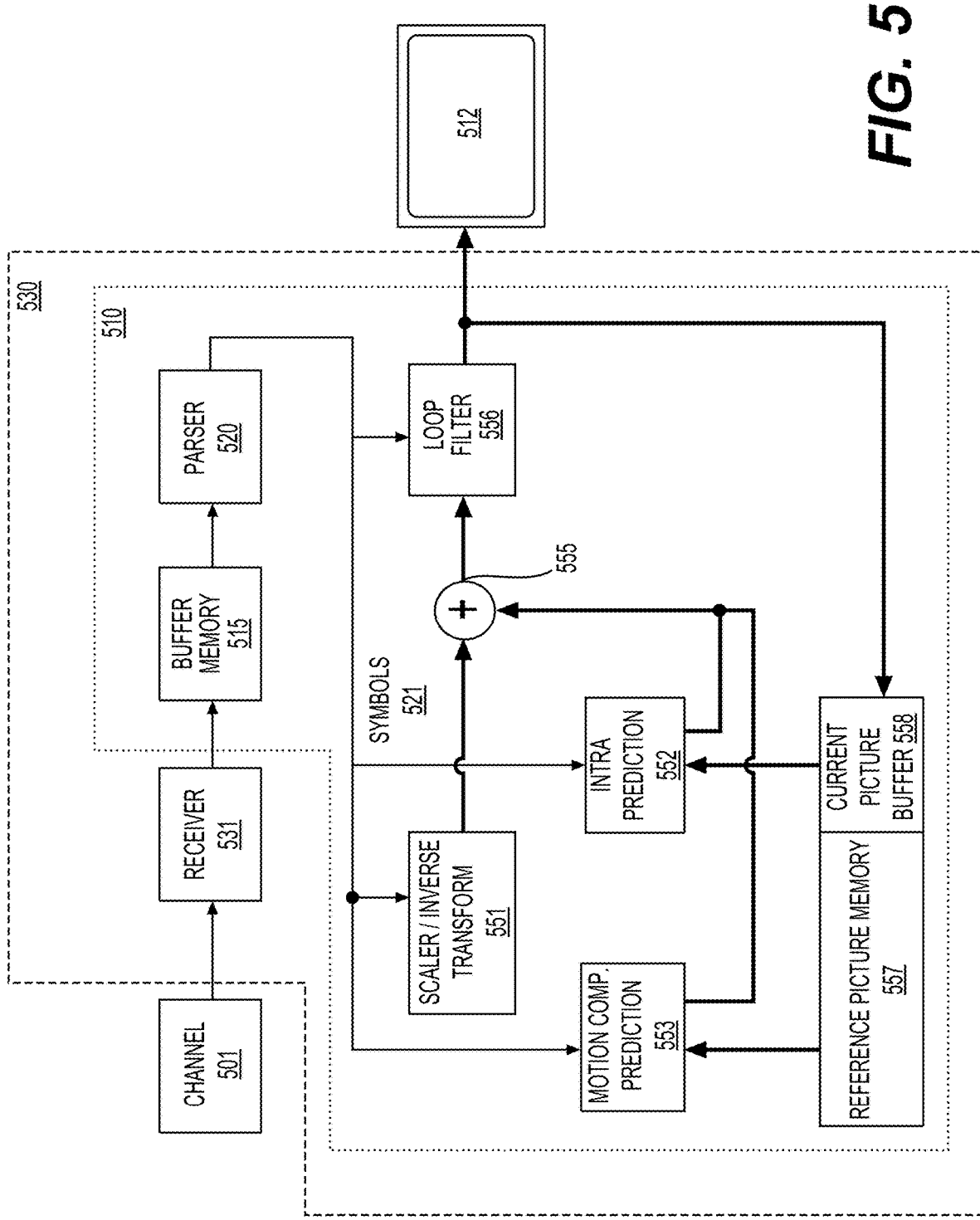
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
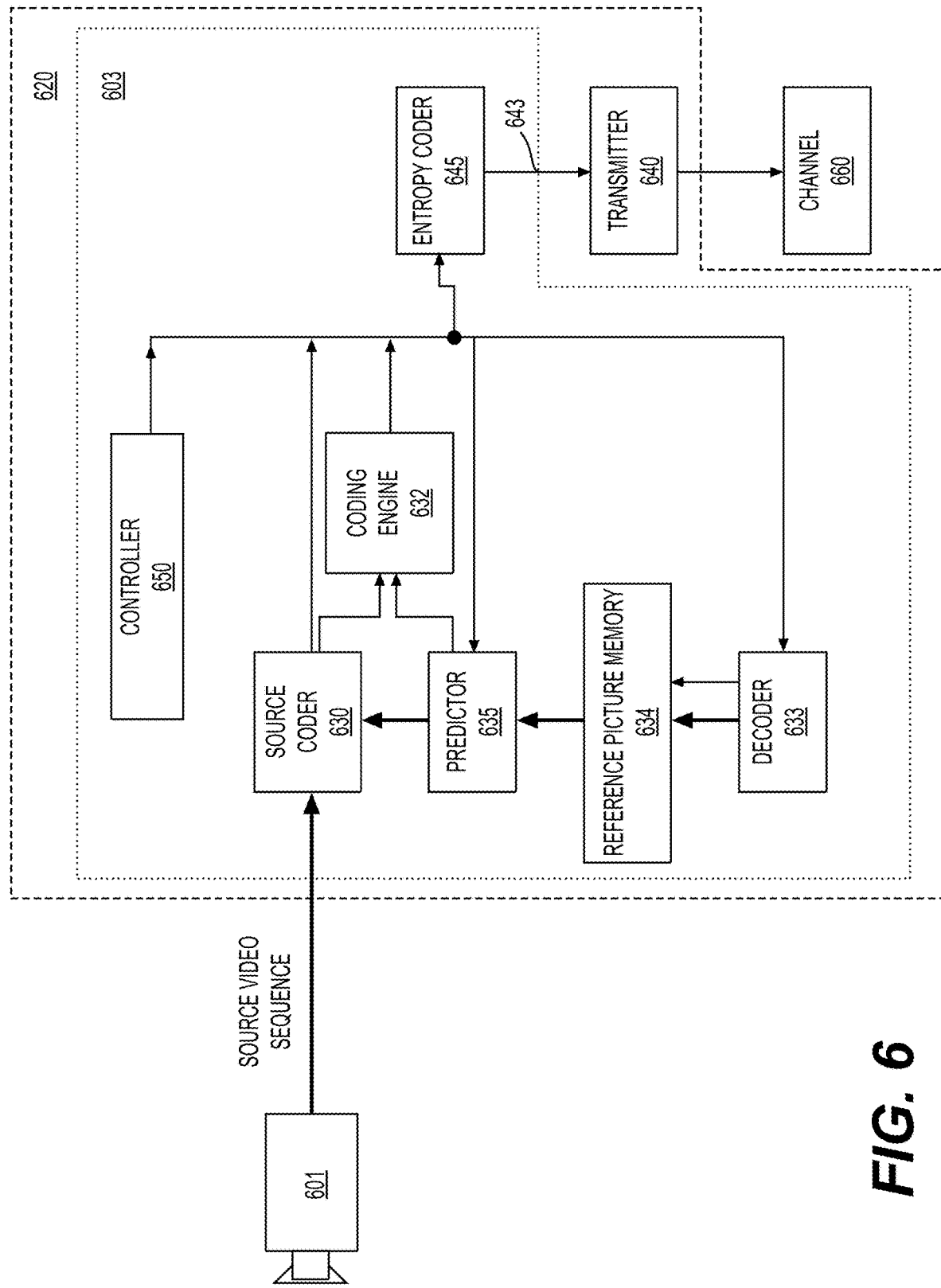
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
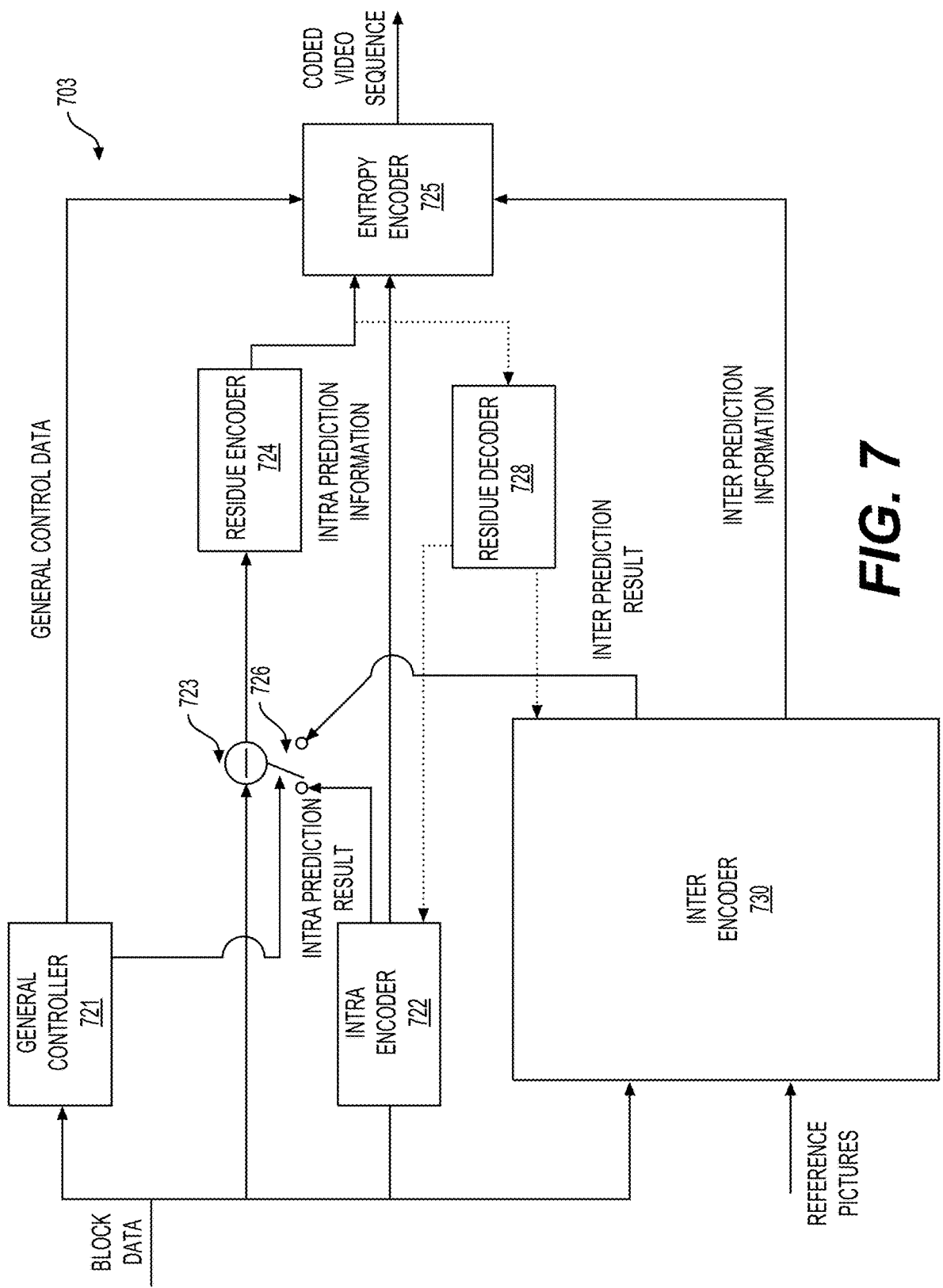
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
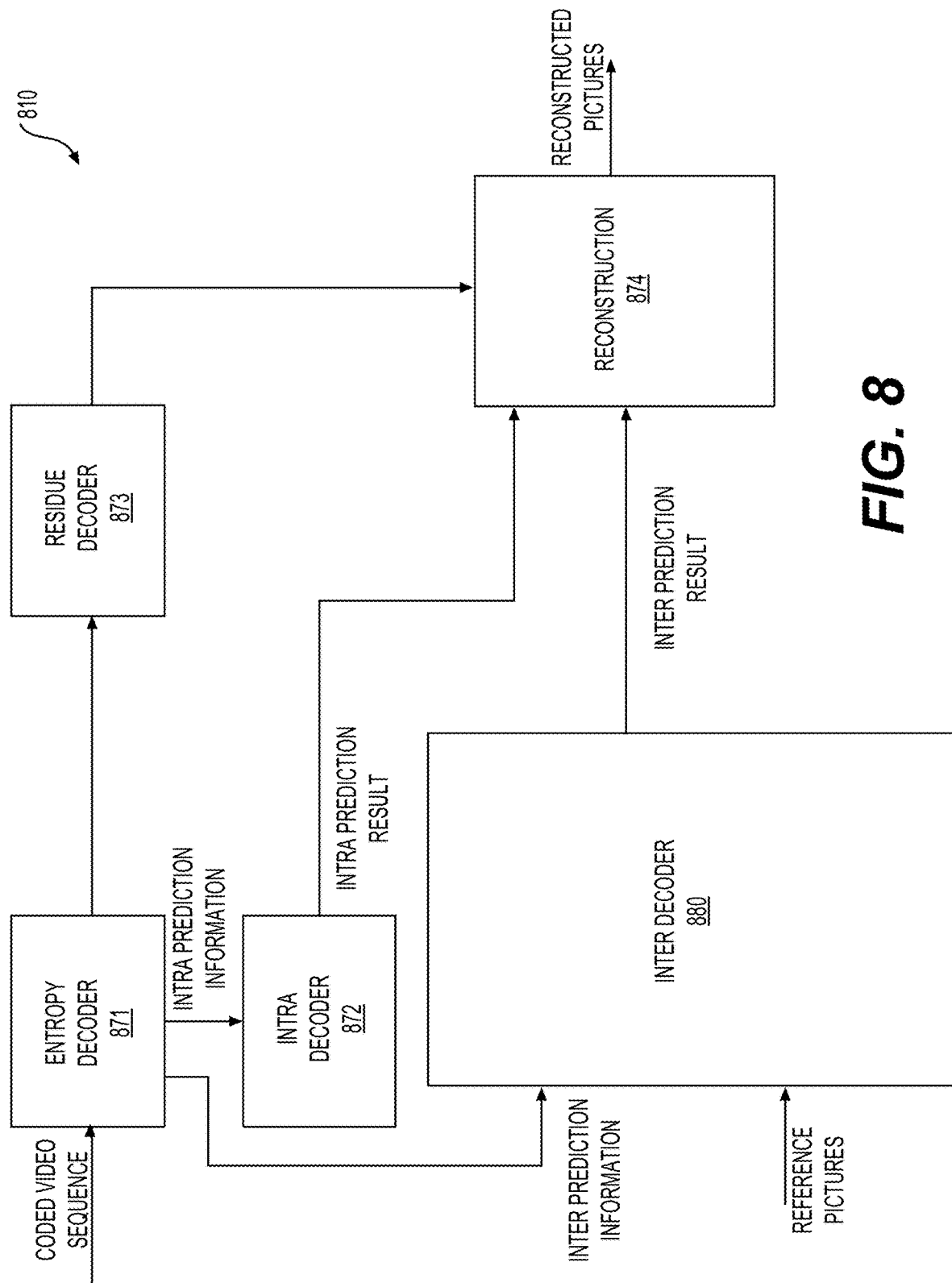
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure include techniques for high-level syntax control for coding tools, such as for screen content coding.

Block based compensation can be used for inter prediction and intra prediction. For the inter prediction, block based compensation from a different picture is known as motion compensation. Block based compensation can also be done from a previously reconstructed area within the same picture, such as in intra prediction. The block based compensation from a reconstructed area within the same picture is referred to as intra picture block compensation, current picture referencing (CPR), or intra block copy (IBC). A displacement vector that indicates an offset between a current block and a reference block (also referred to as a prediction block) in the same picture is referred to as a block vector (BV) where the current block can be encoded/decoded based on the reference block. Different from a motion vector in motion compensation, which can be at any value (positive or negative, at either x or y direction), a BV has a few constraints to ensure that the reference block is available and already reconstructed. Also, in some examples, for parallel processing consideration, some reference area that is a tile boundary, slice boundary, or wavefront ladder shape boundary is excluded.

The coding of a block vector could be either explicit or implicit. In the explicit mode, a BV difference between a block vector and its predictor is signaled. In the implicit mode, the block vector is recovered from a predictor (referred to as block vector predictor) without using the BV difference, in a similar way as a motion vector in the merge mode. The explicit mode can be referred to as a non-merge BV prediction mode. The implicit mode can be referred to as a merge BV prediction mode.

The resolution of a block vector, in some implementations, is restricted to integer positions. In other systems, the block vector is allowed to point to fractional positions.

In some examples, the use of intra block copy at a block level can be signaled using a block level flag, such as an IBC flag. In an embodiment, the block level flag is signaled when the current block is coded explicitly. In some examples, the use of intra block copy at a block level can be signaled using a reference index approach. The current picture under decoding is then treated as a reference picture or a special reference picture. In an example, such a reference picture is put in the last position of a list of reference pictures. The special reference picture is also managed together with other temporal reference pictures in a buffer, such as a decoded picture buffer (DPB).

Figure 1A:
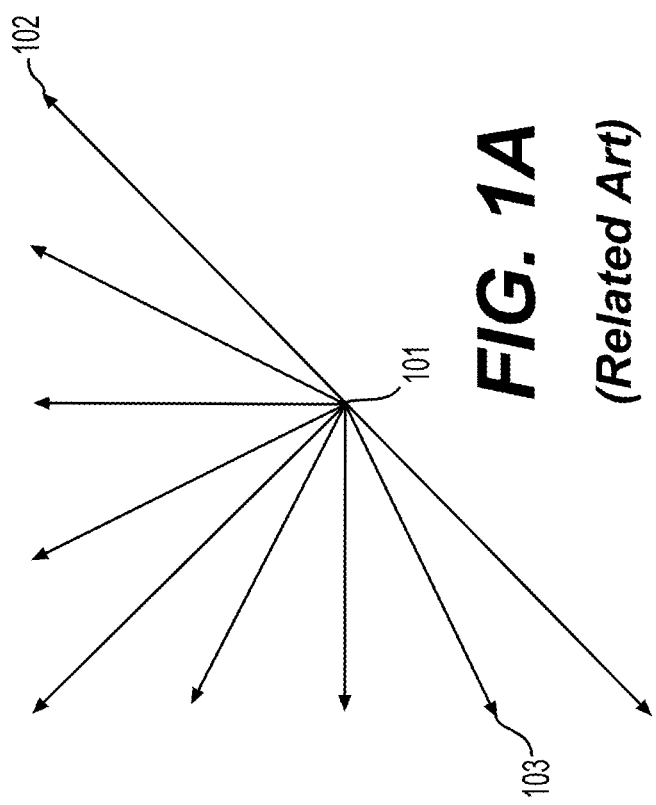
FIG. 1A is a schematic illustration of an exemplary subset of intra prediction modes.
Figure 1B:
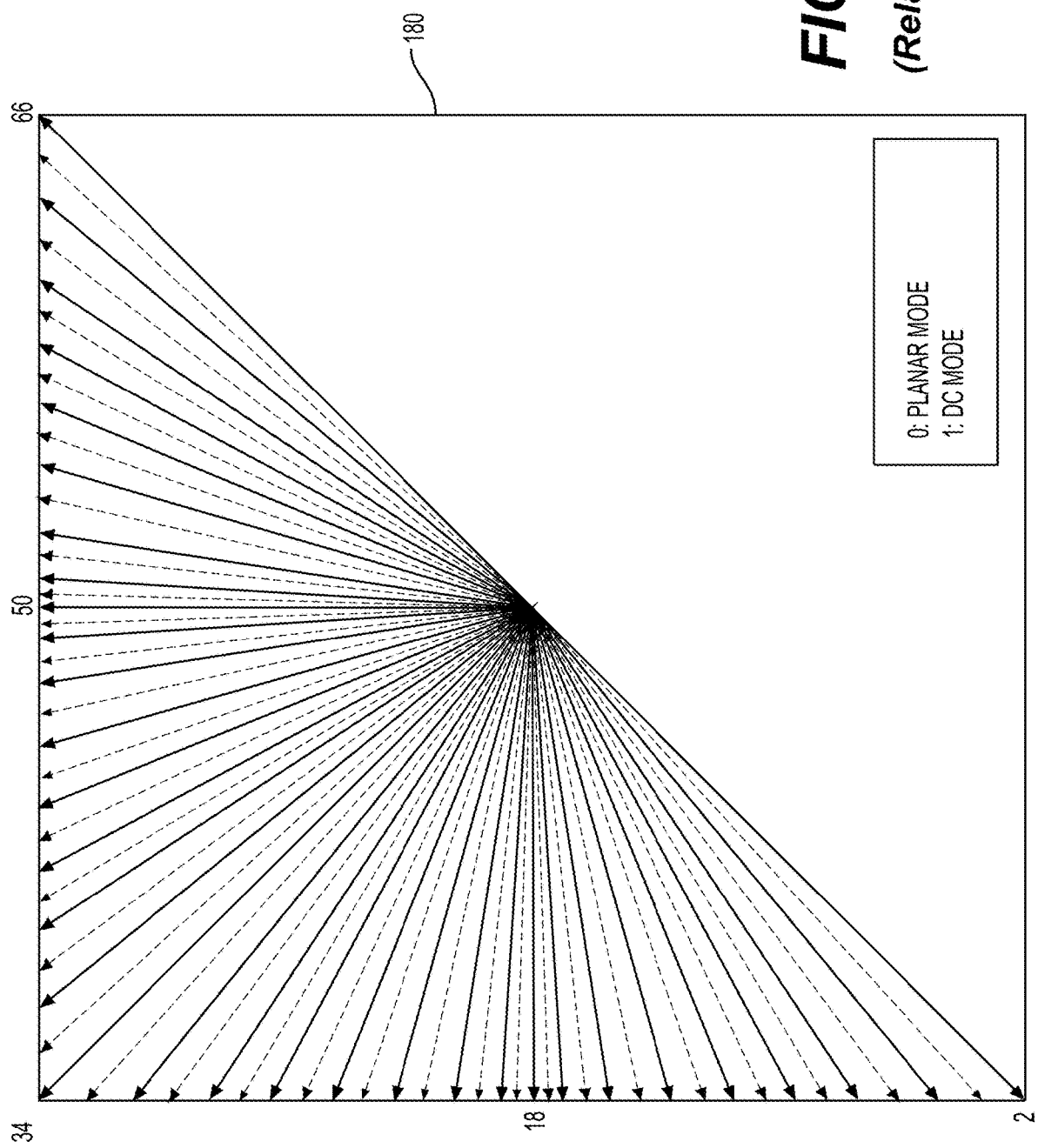
FIG. 1B is an illustration of exemplary intra prediction directions.
Figure 2:
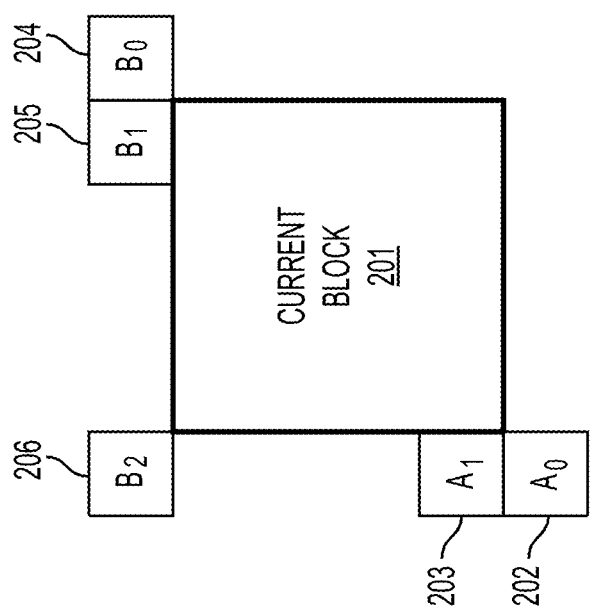
FIG. 2 is a schematic illustration of a current block and its surrounding spatial merge candidates in one example.

There can be variations for the IBC mode. In an example, the IBC mode is treated as a third mode that is different from the intra prediction mode and the inter prediction mode. Accordingly, the BV prediction in the implicit mode (or the merge mode) and the explicit mode are separated from the regular inter mode. A separate merge candidate list can be defined for the IBC mode where entries in the separate merge candidate list are BVs. Similarly, in an example, a BV prediction candidate list in the IBC explicit mode only includes BVs. General rules applied to the two lists (i.e., the separate merge candidate list and the BV prediction candidate list) are that the two lists may follow the same logic as a merge candidate list used in the regular merge mode or an AMVP predictor list used in the regular AMVP mode in terms of the candidate derivation process. For example, the five spatial neighboring locations (e.g., A0, A1, and B0, B1, B2 in FIG. 2), for example, HEVC or VVC inter merge mode are accessed for the IBC mode to derive the separate merge candidate list for the IBC mode.

As described above, a BV of a current block under reconstruction in a picture can have certain constraints, and thus, a reference block for the current block is within a search range. The search range refers to a part of the picture from which the reference block can be selected. For example, the search range may be within certain portions of a reconstructed area in the picture. A size, a position, a shape, and/or the like of the search range can be constrained. Alternatively, the BV can be constrained. In an example, the BV is a two-dimensional vector including an x and a y component, and at least one of the x and y components can be constrained. Constraints can be specified with respect to the BV, the search range, or a combination of the BV and the search range. In various examples, when certain constraints are specified with respect to the BV, the search range is constrained accordingly. Similarly, when certain constraints are specified with respect to the search range, the BV is constrained accordingly.

Figure 9:
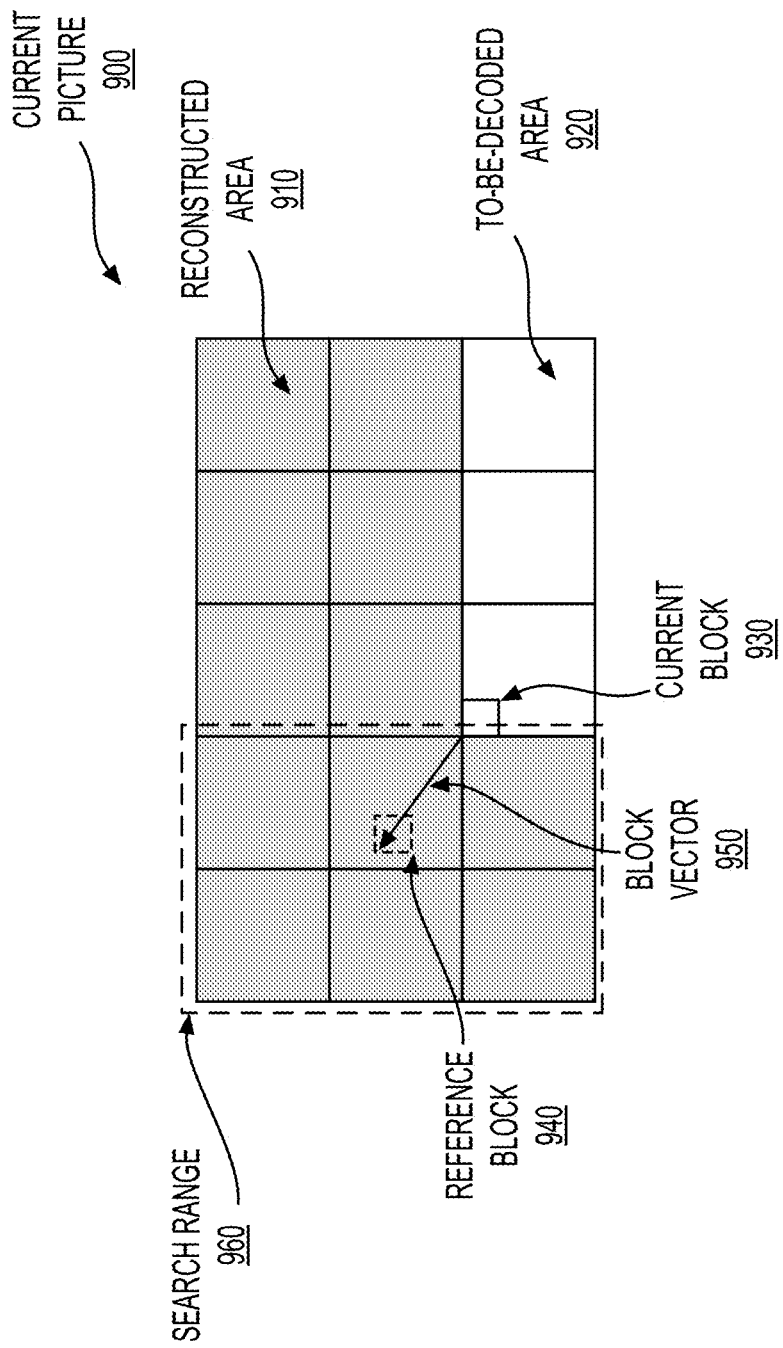
FIG. 9 shows an example of intra block copy according to an embodiment of the disclosure.

FIG. 9 shows an example of intra block copy according to an embodiment of the disclosure. A current picture (900) is to be reconstructed under decoding. The current picture (900) includes a reconstructed area (910) (gray area) and a to-be-decoded area (920) (white area). A current block (930) is under reconstruction by a decoder. The current block (930) can be reconstructed from a reference block (940) that is in the reconstructed area (910). A position offset between the reference block (940) and the current block (930) is referred to as a block vector (950) (or BV (950)). In the FIG. 9 example, a search range (960) is within the reconstructed area (910), the reference block (940) is within the search range (960), and the block vector (950) is constrained to point to the reference block (940) within the search range (960).

Various constraints can be applied to a BV and/or a search range. In an embodiment, a search range for a current block under reconstruction in a current CTB is constrained to be within the current CTB.

In an embodiment, an effective memory requirement to store reference samples to be used in intra block copy is one CTB size. In an example, the CTB size is 128×128 samples. A current CTB includes a current region under reconstruction. The current region has a size of 64×64 samples. Since a reference memory can also store reconstructed samples in the current region, the reference memory can store 3 more regions of 64×64 samples when a reference memory size is equal to the CTB size of 128×128 samples. Accordingly, a search range can include certain parts of a previously reconstructed CTB while a total memory requirement for storing reference samples is unchanged (such as 1 CTB size of 128×128 samples or 4 64×64 reference samples in total). In an example, the previously reconstructed CTB is a left neighbor of the current CTB, such as shown in FIG. 10.

Figure 10:
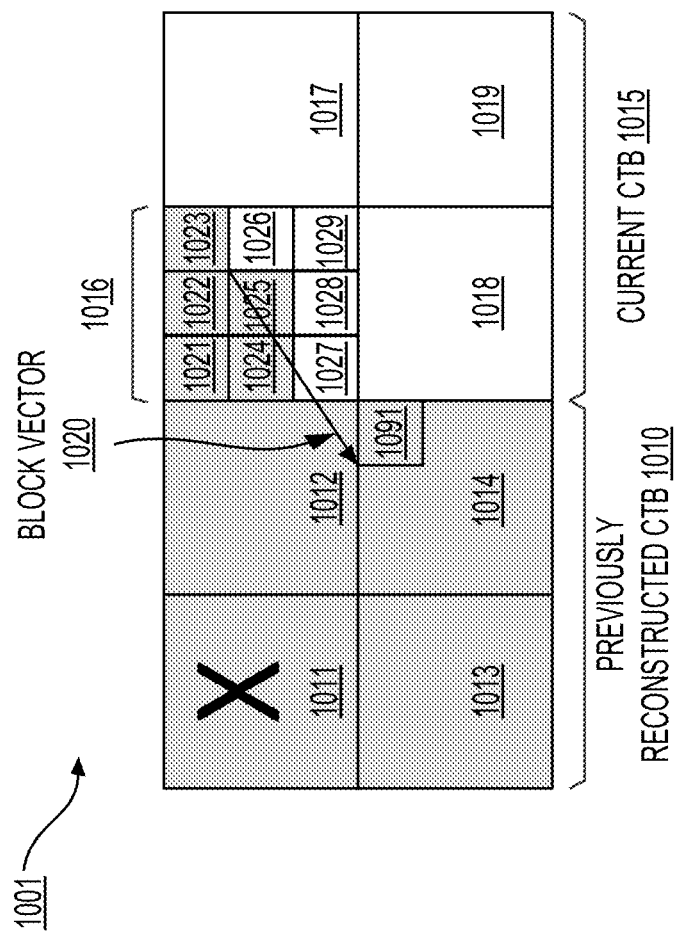
FIG. 10 shows an example of intra block copy according to an embodiment of the disclosure.

FIG. 10 shows an example of intra block copy according to an embodiment of the disclosure. A current picture (1001) includes a current CTB (1015) under reconstruction and a previously reconstructed CTB (1010) that is a left neighbor of the current CTB (1015). CTBs in the current picture (1001) have a CTB size, such as 128×128 samples, and a CTB width, such as 128 samples. The current CTB (1015) includes 4 regions (1016)-(1019), where the current region (1016) is under reconstruction. The current region (1016) includes a plurality of coding blocks (1021)-(1029). Similarly, the previously reconstructed CTB (1010) includes 4 regions (1011)-(1014). The coding blocks (1021)-(1025) are already reconstructed, the current block (1026) is under reconstruction, and the coding blocks (1026)-(1027) and the regions (1017)-(1019) are to be reconstructed.

The current region (1016) has a collocated region (i.e., the region (1011), in the previously reconstructed CTB (1010)). A relative position of the collocated region (1011) with respect to the previously reconstructed CTB (1010) can be identical to a relative position of the current region (1016) with respect to the current CTB (1015). In the example illustrated in FIG. 10, the current region (1016) is a top left region in the current CTB (1015), and thus, the collocated region (1011) is also a top left region in the previously reconstructed CTB (1010). Since a position of the previously reconstructed CTB (1010) is offset from a position of the current CTB (1015) by the CTB width, a position of the collocated region (1011) is offset from a position of the current region (1016) by the CTB width.

In an embodiment, a collocated region of the current region (1016) is in a previously reconstructed CTB where a position of the previously reconstructed CTB is offset by one or multiples of the CTB width from the position of the current CTB (1015), and thus, a position of the collocated region is also offset by a corresponding one or multiples of the CTB width from the position of the current region (1016). The position of the collocated region can be left shifted, up shifted, or the like from the current region (1016).

As described above, a size of a search range for the current block (1026) is constrained by the CTB size. The size of the search range can be constrained to other sizes in some embodiments. In the FIG. 10 example, the search range can include the regions (1012)-(1014) in the previously reconstructed CTB (1010) and a portion of the current region (1016) that is already reconstructed, such as the coding blocks (1021)-(1025). The search range further excludes the collocated region (1011) so that the size of the search range is within the CTB size. Referring to FIG. 10, a reference block (1091) is located in the region (1014) of the previously reconstructed CTB (1010). A block vector (1020) indicates an offset between the current block (1026) and the respective reference block (1091). The reference block (1091) is in the search range.

The example illustrated in FIG. 10 can be suitably adapted to other scenarios where a current region is located at another location in the current CTB (1015). In an example, when a current block is in the region (1017), a collocated region for the current block is the region (1012). Therefore, a search range can include the regions (1013)-(1014), the region (1016), and a portion of the region (1017) that is already reconstructed. The search range further excludes the region (1011) and the collocated region (1012) so that the size of the search range is within the CTB size. In an example, when a current block is in the region (1018), a collocated region for the current block is the region (1013). Therefore, a search range can include the region (1014), the regions (1016)-(1017), and a portion of the region (1018) that is already reconstructed. The search range further excludes the regions (1011)-(1012) and the collocated region (1013) so that the size of the search range is within the CTB size. In an example, when a current block is in the region (1019), a collocated region for the current block is the region (1014). Therefore, a search range can include the regions (1016)-(1018), and a portion of the region (1019) that is already reconstructed. The search range further excludes the previously reconstructed CTB (1010) so that the size of the search range is within the CTB size.

In the above description, a reference block can be in the previously reconstructed CTB (1010) or the current CTB (1015).

Figure 11:
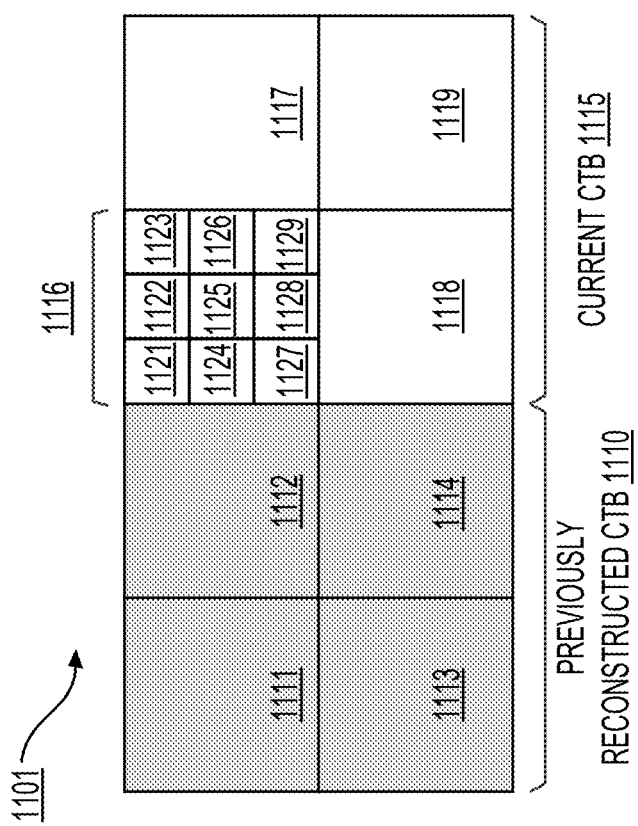
FIG. 11 shows an example of intra block copy according to an embodiment of the disclosure.

FIG. 11 shows an example of intra block copy according to an embodiment of the disclosure. A current picture (1101) includes a current CTB (1115) under reconstruction and a previously reconstructed CTB (1110) that is a left neighbor of the current CTB (1115). CTBs in the current picture (1101) have a CTB size and a CTB width. The current CTB (1115) includes 4 regions (1116)-(1119) where the current region (1116) is under reconstruction. The current region (1116) includes a plurality of coding blocks (1121)-(1129). Similarly, the previously reconstructed CTB (1110) includes 4 regions (1111)-(1114). The current block (1121) under reconstruction is to be reconstructed first in the current region (1116) and the coding blocks (1122)-(1129) are to be reconstructed. In an example, the CTB size is 128×128 samples, each of the regions (1111)-(1114) and (1116)-(1119) is 64×64 samples. A reference memory size is equal to the CTB size and is 128×128 samples, and thus, the search range, when bounded by the reference memory size, includes 3 regions and a portion of an additional region.

Similarly as described with reference to FIG. 10, the current region (1116) has a collocated region (i.e., the region (1111) in the previously reconstructed CTB (1110)). A reference block for the current block (1121) can be in the region (1111), and thus, a search range can include the regions (1111)-(1114). For example, when the reference block is in the region (1111), a collocated region of the reference block is the region (1116), where no samples in the region (1116) have been reconstructed prior to the reconstruction of the current block (1121). However, as described with reference to FIG. 10, for example, after the reconstruction of the coding block (1121), the region (1111) is no longer available to be included in a search range for reconstructing the coding block (1122). Therefore, a tight synchronization and timing control of the reference memory buffer is to be used and can be challenging.

According to some embodiments, when a current block is to be reconstructed first in a current region of a current CTB, a search range can exclude a collocated region of the current region that is in a previously reconstructed CTB where the current CTB and the previously reconstructed CTB are in a same current picture. A block vector can be determined such that a reference block is in the search range that excludes the collocated region in the previously reconstructed CTB. In an embodiment, the search range includes coding blocks that are reconstructed after the collocated region and before the current block in a decoding order.

In the descriptions below, a CTB size can vary and a maximum CTB size is set to be identical to a reference memory size. In an example, the reference memory size or the maximum CTB size is 128×128 samples. The descriptions can be suitably adapted to other reference memory sizes or maximum CTB sizes.

In an embodiment, the CTB size is equal to the reference memory size. The previously reconstructed CTB is a left neighbor of the current CTB, a position of the collocated region is offset by a CTB width from a position of the current region, and the coding blocks in the search range are in at least one of: the current CTB and the previously reconstructed CTB.

FIGS. 12A-12D show examples of intra block copy according to an embodiment of the disclosure. Referring to FIGS. 12A-12D, a current picture (1201) includes a current CTB (1215) under reconstruction and a previously reconstructed CTB (1210) that is a left neighbor of the current CTB (1215). CTBs in the current picture (1201) have a CTB size and a CTB width. The current CTB (1215) includes 4 regions (1216)-(1219). Similarly, the previously reconstructed CTB (1210) includes 4 regions (1211)-(1214). In an embodiment, the CTB size is a maximum CTB size and is equal to a reference memory size. In an example, the CTB size and the reference memory size are 128×128 samples, and thus, each of the regions (1211)-(1214) and (1216)-(1219) has a size of 64×64 samples.

In the examples illustrated in FIGS. 12A-12D, the current CTB (1215) includes a top left region, a top right region, a bottom left region, and a bottom right region that correspond to the regions (1216)-(1219), respectively. The previously reconstructed CTB (1210) includes a top left region, a top right region, a bottom left region, and a bottom right region that correspond to the regions (1211)-(1214), respectively.

Figure 12A:
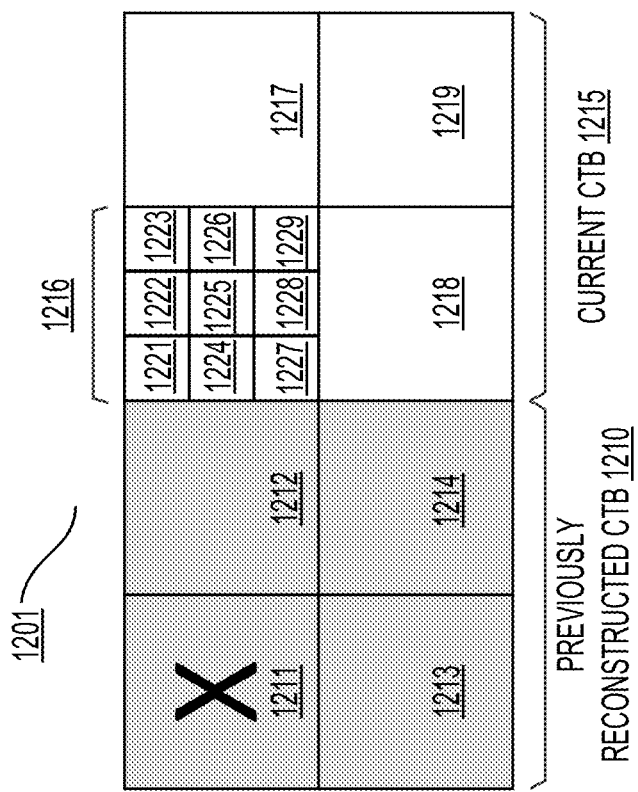

Referring to FIG. 12A, the current region (1216) is under reconstruction. The current region (1216) can include a plurality of coding blocks (1221)-(1229). The current region (1216) has a collocated region, i.e., the region (1211), in the previously reconstructed CTB (1210). A search range for one of the coding blocks (1221)-(1229) to be reconstructed can exclude the collocated region (1211). The search range can include the regions (1212)-(1214) of the previously reconstructed CTB (1210) that are reconstructed after the collocated region (1211) and before the current region (1216) in a decoding order.

Referring to FIG. 12A, a position of the collocated region (1211) is offset by the CTB width, such as 128 samples, from a position of the current region (1216). For example, the position of the collocated region (1211) is left shifted by 128 samples from the position of the current region (1216).

Referring again to FIG. 12A, when the current region (1216) is the top left region of the current CTB (1215), the collocated region (1211) is the top left region of the previously reconstructed CTB (1210), and the search region excludes the top left region of the previously reconstructed CTB.

Figure 12B:
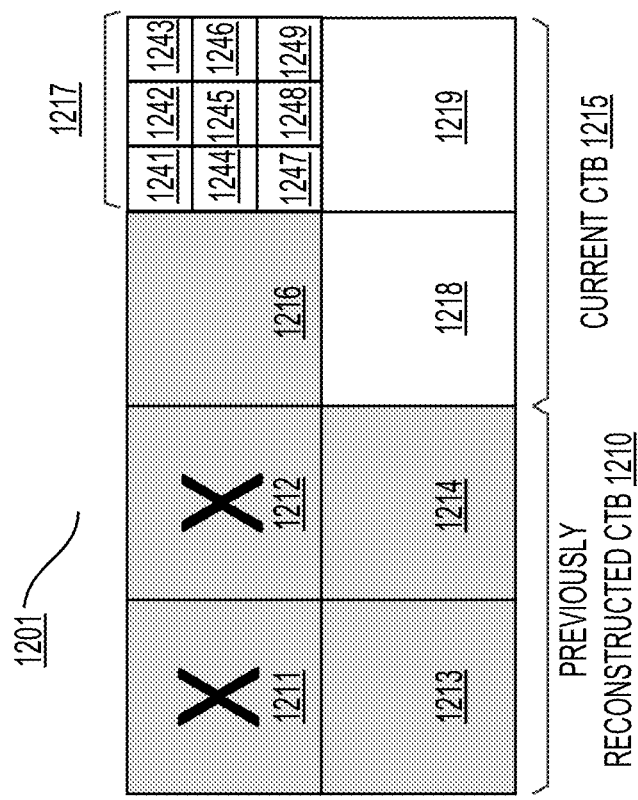

Referring to FIG. 12B, the current region (1217) is under reconstruction. The current region (1217) can include a plurality of coding blocks (1241)-(1249). The current region (1217) has a collocated region (i.e., the region (1212), in the previously reconstructed CTB (1210)). A search range for one of the plurality of coding blocks (1241)-(1249) can exclude the collocated region (1212). The search range includes the regions (1213)-(1214) of the previously reconstructed CTB (1210) and the region (1216) in the current CTB (1215) that are reconstructed after the collocated region (1212) and before the current region (1217). The search range further excludes the region (1211) due to constraint of the reference memory size (i.e., one CTB size). Similarly, a position of the collocated region (1212) is offset by the CTB width, such as 128 samples, from a position of the current region (1217).

In the FIG. 12B example, the current region (1217) is the top right region of the current CTB (1215), the collocated region (1212) is also the top right region of the previously reconstructed CTB (1210), and the search region excludes the top right region of the previously reconstructed CTB (1210).

Figure 12C:
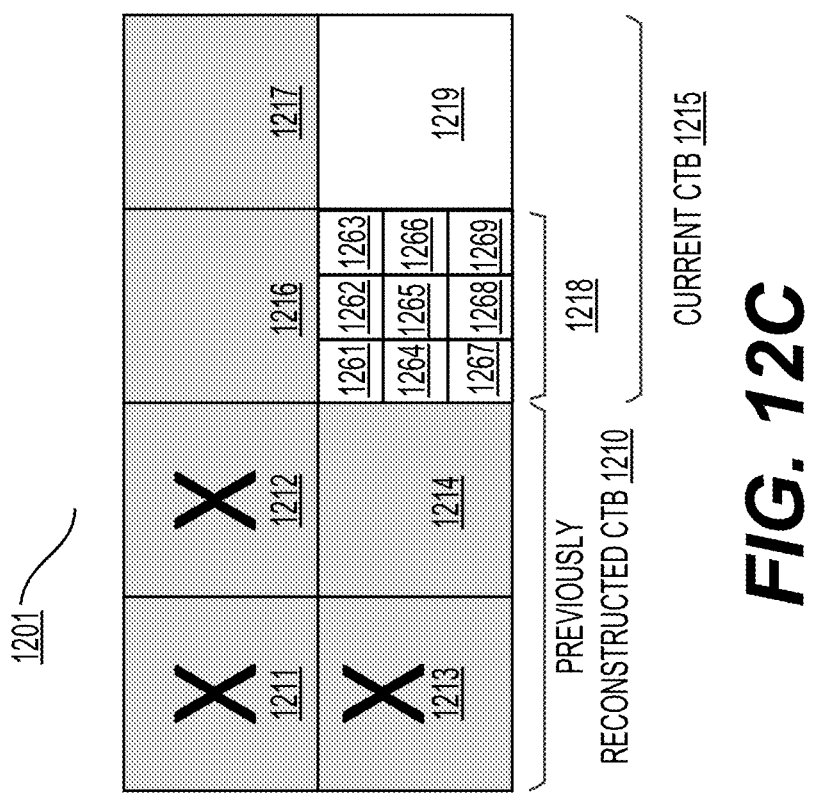

Referring to FIG. 12C, the current region (1218) is under reconstruction. The current region (1218) can include a plurality of coding blocks (1261)-(1269). The current region (1218) has a collocated region (i.e., the region (1213)), in the previously reconstructed CTB (1210). A search range for one of the plurality of coding blocks (1261)-(1269) can exclude the collocated region (1213). The search range includes the region (1214) of the previously reconstructed CTB (1210) and the regions (1216)-(1217) in the current CTB (1215) that are reconstructed after the collocated region (1213) and before the current region (1218). Similarly, the search range further excludes the regions (1211)-(1212) due to constraint of the reference memory size. A position of the collocated region (1213) is offset by the CTB width, such as 128 samples, from a position of the current region (1218). In the FIG. 12C example, when the current region (1218) is the bottom left region of the current CTB (1215), the collocated region (1213) is also the bottom left region of the previously reconstructed CTB (1210), and the search region excludes the bottom left region of the previously reconstructed CTB (1210).

Figure 12D:
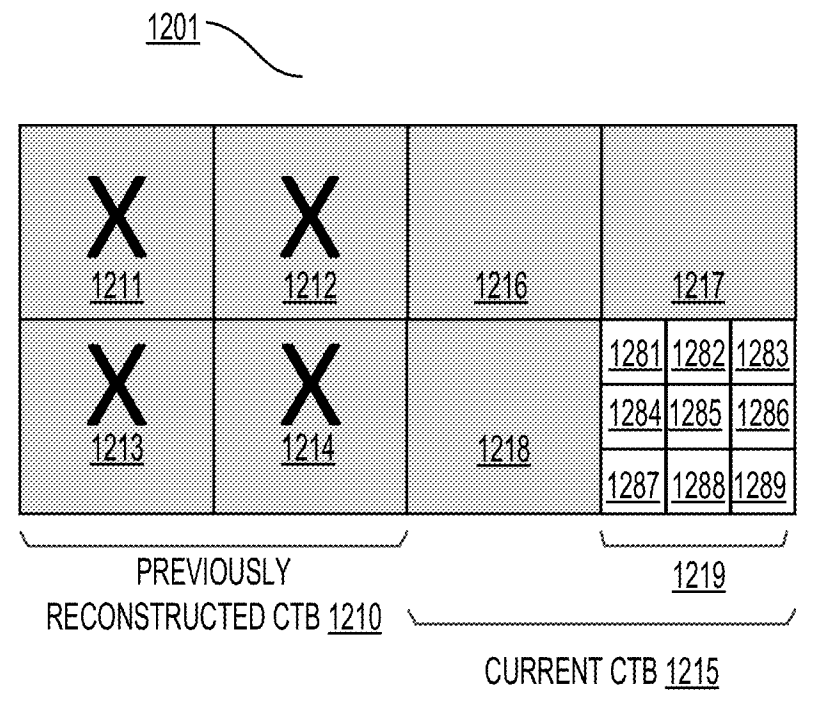

Referring to FIG. 12D, the current region (1219) is under reconstruction. The current region (1219) can include a plurality of coding blocks (1281)-(1289). The current region (1219) has a collocated region (i.e., the region (1214)), in the previously reconstructed CTB (1210). A search range for one of the plurality of coding blocks (1281)-(1289) can exclude the collocated region (1214). The search range includes the regions (1216)-(1218) in the current CTB (1215) that are reconstructed after the collocated region (1214) and before the current region (1219) in a decoding order. The search range excludes the regions (1211)-(1213) due to constraint of the reference memory size, and thus, the search range excludes the previously reconstructed CTB (1210). Similarly, a position of the collocated region (1214) is offset by the CTB width, such as 128 samples, from a position of the current region (1219). In the FIG. 12D example, when the current region (1219) is the bottom right region of the current CTB (1215), the collocated region (1214) is also the bottom right region of the previously reconstructed CTB (1210) and the search region excludes the bottom right region of the previously reconstructed CTB (1210).

Figure 13:
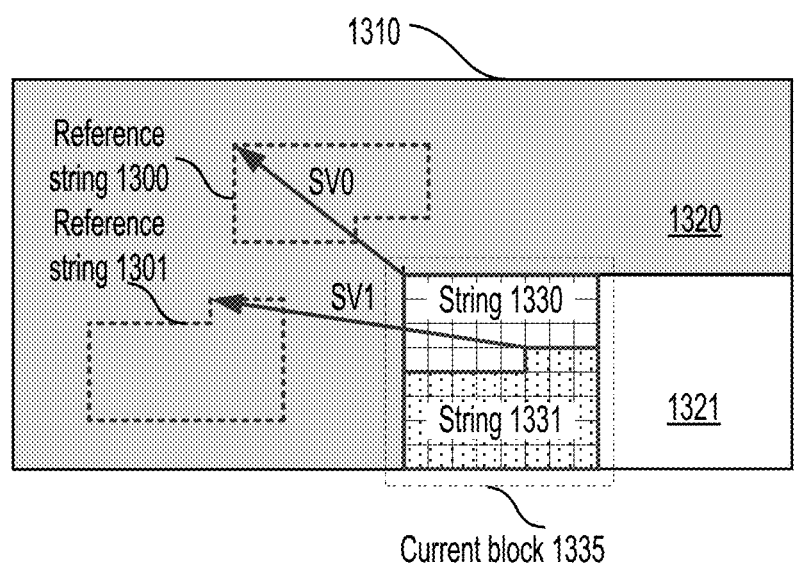
FIG. 13 shows an example of a string copy mode according to an embodiment of the disclosure.

FIG. 13 shows an example of a string copy mode according to an embodiment of the disclosure. The string copy mode can also be referred to as a string matching mode, an intra string copy mode, or string prediction. A current picture (1310) includes a reconstructed region (a gray area) (1320) and a region (1321) that is under reconstruction. A current block (1335) in the region (1321) is under reconstruction. The current block (1335) can be a CB, a CU, or the like. The current block (1335) can include a plurality of strings (e.g., strings (1330) and (1331)). In an example, the current block (1335) is divided into a plurality of continuous strings where one string is followed by a next string along a scan order. The scan order can be any suitable scan order, such as a raster scan order, a traverse scan order, or another predefined scan order.

The reconstructed region (1320) can be used as a reference area to reconstruct the strings (1330) and (1331).

For each of the plurality of strings, a string offset vector (referred to as an SV) and/or a length of the string (referred to as a string length) can be signaled or inferred. The SV (e.g., a SV0) can be a displacement vector that indicates a displacement between the string (e.g., the string (1330)) to be reconstructed and a respective reference string (e.g., a reference string (1300)) that is located in the reference area (1320) already reconstructed. The reference string can be used to reconstruct the string to be reconstructed. Thus, the SV can indicate where the corresponding reference string is located in the reference area (1320). The string length can also correspond to a length of the reference string. Referring to FIG. 13, the current block (1335) is an 8×8 CB including 64 samples and is divided into two strings (e.g., the strings (1330) and (1331)) using the raster scan order. The string (1330) includes the first 29 samples of the current block (1335), and the string (1331) includes the remaining 35 samples of the current block (1335). The reference string (1300) used to reconstruct the string (1330) can be indicated by a corresponding string vector SV0, and a reference string (1301) used to reconstruct the string (1331) can be indicated by a corresponding string vector SV1.

In general, a string size (also referred to as a string length) can refer to a length of a string or a number of samples in a string. Referring to FIG. 13, the string (1330) includes 29 samples, and thus a string size or a string length of the string (1330) is 29. The string (1331) includes 35 samples, and thus a string size or a string length of the string (1331) is 35. A string location (or a string position) can be represented by a sample position of a sample (e.g., a first sample in a decoding order) in the string.

The above descriptions can be suitably adapted to reconstruct a current block that includes any suitable number of strings. In an example, when a sample in a current block does not have a matching sample in a reference area, an escape sample (or an escape pixel) is signaled, and a value of the escape sample can be coded directly without referring to a reconstructed sample in the reference area. In an example, a block includes a plurality of strings and one or more escape samples where the plurality of strings is reconstructed using the string copy mode and the one or more escape samples are coded directly and are not predicted using the string copy mode. The one or more escape samples can be located at any suitable position(s) within the block. In an example, the one or more escape samples in the bock are located outside the plurality of strings.

High level syntax (HLS) can specify parameter(s) that can be shared by lower level coding layer(s). For example, a CTU size (also a maximum size of a CB) is specified at a sequence level or in a sequence parameter set (SPS), and is not to be changed from one picture to another picture. The HLS can correspond to a high-level. The high-level (or the high level) can be higher than a block level. The high-level can correspond to a video sequence (or a sequence level), one or more pictures, a picture (or a picture level), a slice (or a slice level), a tile group (or a tile group level), a tile (or a tile level), a CTU (or a CTU level), or the like. In general, a HLS can include a SPS, a picture parameter set (PPS), a picture header, a slice header, an adaptive parameter set (APS), and the like. In an example, the HLS corresponds to a tile, a tile group, or a similar sub-picture level. In an example, the HLS corresponds to a CTU.

Each HLS can have a specific coverage range. For example, a PPS can specify common syntax elements that may be shared by one or more pictures. A picture header can specify common syntax elements used within a picture. A first HLS corresponding to a first level may override syntax elements provided in a second HLS corresponding to a second level where the second level is higher than the first level and a second range covered by the second HLS includes a first range covered by the first HLS. For example, a HLS for a picture header (also referred to as a picture header HLS) may override syntax elements in a PPS for which a current picture refers to where the first HLS is the picture header HLS and the second HLS is the PPS. In an example, a slice header that belongs to the current picture may override syntax elements or parameters that have been assigned at the picture header of the same current picture.

Figure 14:
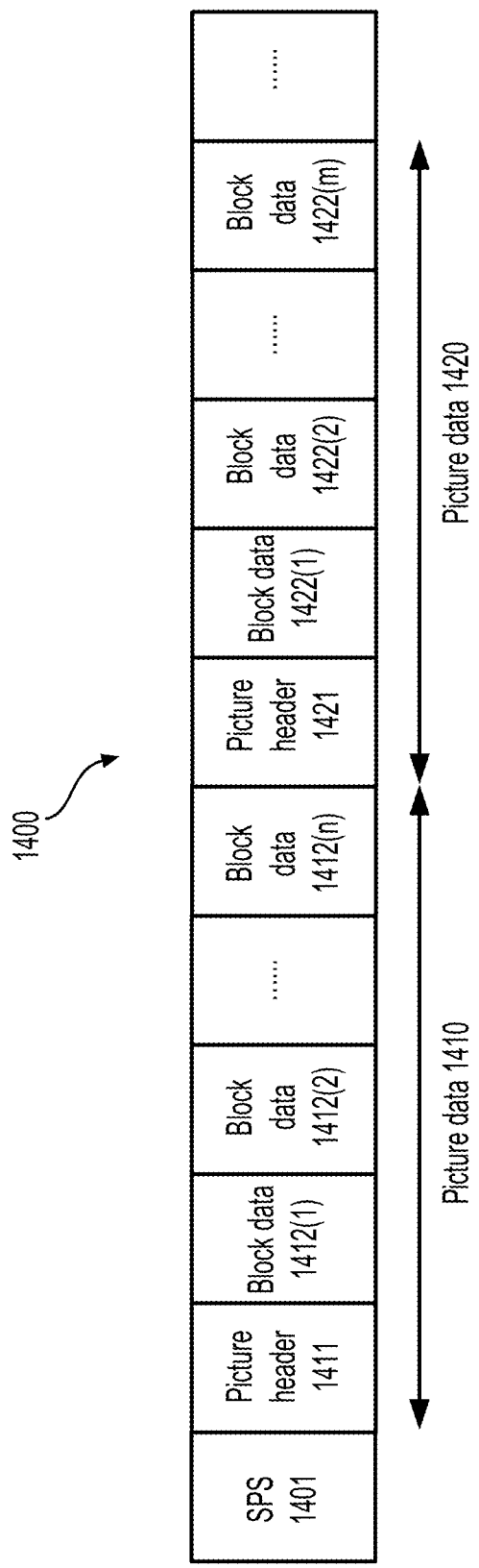
FIG. 14 shows an exemplary bitstream structure according to an embodiment of the disclosure.

FIG. 14 shows an exemplary bitstream structure (1400) including an SPS (1401), picture headers (1411) and (1421), and block level syntax (e.g., block data (1412(1)-(*n*)) and block data (1422(1)-(*m*)) according to an embodiment of the disclosure. Parameters n and m can be any suitable positive integer. The parameters n and m can be identical or different. The block data (1412(1)-(*n*)) and (1422(1)-(*m*)) can include data such as residues of blocks and side information (or control information) used to code the blocks. Referring to FIG. 14, the SPS (1401) corresponds to a video sequence that includes a plurality of pictures, such as a first picture and a second picture. The first picture can include the blocks 1-*n* and the second picture can include the blocks 1-*m*.

Syntax elements used to code the blocks 1-*n* and 1-*m* can be included in various HLSs, such as the SPS (1401) and the picture headers (1411) and (1421). Syntax elements used to code the blocks 1-*n* and 1-*m* can also be included in block-level syntax, such as in the block data (1412(1)-(*n*)) and (1422(1)-(*m*)), respectively. Accordingly, picture data (1410) for the first picture includes the picture header (1411) followed by the block data (1412(1)-(*n*)). The picture data (1420) for the second picture can include the picture header (1421) followed by the block data (1422(1)-(*n*)).

The SPS (1401) can specify common syntax elements that may be shared by the video sequence. The picture header (1411) can specify common syntax elements used within the first picture. The picture header (1421) can specify common syntax elements used within the second picture. In an example, a syntax element in the picture header (1411) overrides a corresponding syntax element in the SPS (1401). In an example, a syntax element in the block data (e.g., (1412(2)) override a corresponding syntax element in the picture header (1411).

FIGS. 15A-15B show an exemplary syntax table (1500) according to an embodiment of the disclosure. The syntax table (1500) can correspond to a suitable HLS at a suitable high-level. The syntax table (1500) can include flags (or coding tool enabling flags) for coding tools included in certain defined profiles. One or more of the flags can be signaled. For example, the syntax table (1500) is an SPS syntax table including an SPS. In an example, such as in AVS3, the syntax table (1500) shows a set of SPS flags for coding tools included in certain defined profiles.

Each of the flags can be used to enable (e.g., by setting the flag as 1) or disable (e.g., by setting the flag as 0) a certain coding tool in the bitstream. When the flag is not presented in the bitstream, the flag can be inferred to be disabled (e.g., a value of the flag being 0). A variable (or coding tool variable) corresponding to the flag can be set to equal to the flag. In an example, the variable corresponding to the flag is not signaled and is derived from the flag. In an example, the variable corresponding to the flag can be modified, and the flag is not modified.

In an example, a first set of coding tool enabling flags considered for coding camera-captured content includes but is not limited to flags such as an eipm_enable_flag, a dmvr_enable_flag, a bio_enable_flag, an affine_umve_enable_flag, an etmvp_enable_flag, a subtmvp_enable_flag, a st_chroma_enable_flag, an ipf_chroma_enable_flag, an ealf_enable_flag, an sp_enable_flag, and an iip_enable_flag. The first set of coding tool enabling flags can correspond to a first set of coding tools, as described below. The first set of coding tools can include any suitable coding tools for coding the camera-captured content. For example, the first set of coding tools includes but is not limited to one or more of an extended intra prediction mode, a decoder side motion vector refinement, a bi-directional optical flow, an ultimate motion vector expression, an enhanced temporal motion vector prediction, a subblock based temporal motion vector prediction, a chroma secondary transform, a chroma intra prediction filtering, an enhanced adaptive loop filtering, a secondary prediction for affine mode, and an improved intra prediction mode.

Each of the first set of coding tool enabling flags can indicate whether a respective one of the first set of coding tools may be used in the bitstream. For example, the eipm_enable_flag corresponds to the extended intra prediction mode. The first set of coding tools can be used for coding the camera-captured content and can be referred to as camera-captured content coding tools.

In an example, a second set of coding tool enabling flags considered for coding screen content includes flags such as an ibc_enable_flag, an isc_enable_flag, an fimc_enable_flag, and an ists_enable_flag. The second set of coding tool enabling flags can correspond to a second set of coding tools (also referred to as screen content coding (SCC) tools), as described below. Each of the second set of coding tool enabling flags can indicate whether a respective one of the second set of coding tools may be used in the bitstream. For example, the ibc_enable_flag corresponds to the intra block copy mode. The second set of coding tools (or the SCC tools) can be used for coding the screen content. In an example, the first set of coding tools can be used for coding the camera-captured content more efficiently than coding the screen content.

The semantics of a subset of the flags in the syntax table (1500) are listed as follows where the subset of the flags in the syntax table (1500) includes the first set of coding tool enabling flags and the second set of coding tool enabling flags.

The eipm_enable_flag can indicate whether the extended intra prediction mode may be used in the bitstream, for example, at the high-level (e.g., the SPS level for the video sequence). The eipm_enable_flag being equal to 1 can indicate that the extended intra prediction mode may be used in the bitstream, for example, at the high-level (e.g., the SPS level for the video sequence). The eipm_enable_flag being equal to 0 can indicate that the extended intra prediction mode cannot be used in the bitstream, for example, at the high-level. When the eipm_enable_flag is not present (e.g., not signaled in the syntax table (1500)), a value of the eipm_enable_flag can be inferred to be 0. A variable (or coding tool variable) EipmEnableFlag can be set to equal to the eipm_enable_flag. In an example, the variable EipmEnableFlag is not signaled and is derived from the eipm_enable_flag. In an example, the variable EipmEnableFlag can be modified, and the eipm_enable_flag is not modified.

The dmvr_enable_flag can indicate whether the decoder side motion vector refinement may be used in the bitstream, for example, at the high-level (e.g., the SPS level for the video sequence). The dmvr_enable_flag being equal to 1 can indicate that the decoder side motion vector refinement may be used in the bitstream, for example, at the high-level. The dmvr_enable_flag being equal to 0 can indicate that the decoder side motion vector refinement cannot be used in the bitstream, for example, at the high-level. When the dmvr_enable_flag is not present (e.g., not signaled in the syntax table (1500)), a value of the dmvr_enable_flag can be inferred to be 0. A variable (or coding tool variable) DmvrEnableFlag can be set to equal to the dmvr_enable_flag. In an example, the variable DmvrEnableFlag is not signaled and is derived from the dmvr_enable_flag. In an example, the variable DmvrEnableFlag can be modified, and the dmvr_enable_flag is not modified.

The bio_enable_flag can indicate whether the bi-directional optical flow may be used in the bitstream, for example, at the high-level (e.g., the SPS level for the video sequence). The bio_enable_flag being equal to 1 can indicate that the bi-directional optical flow may be used in the bitstream, for example, at the high-level. The bio_enable_flag being equal to 0 can indicate that the bi-directional optical flow cannot be used in the bitstream, for example, at the high-level. When the bio_enable_flag is not present (e.g., not signaled in the syntax table (1500)), a value of the bio_enable_flag can be inferred to be 0. A variable (or coding tool variable) BioEnableFlag can be set to equal to the bio_enable_flag. In an example, the variable BioEnableFlag is not signaled and is derived from the bio_enable_flag. In an example, the variable BioEnableFlag can be modified, and the bio_enable_flag is not modified.

The affine_umve_enable_flag can indicate whether the ultimate motion vector expression for affine mode may be used in the bitstream, for example, at the high-level (e.g., the SPS level for the video sequence). The affine_umve_enable_flag being equal to 1 can indicate that the ultimate motion vector expression for affine mode may be used in the bitstream, for example, at the high-level. The affine_umve_enable_flag being equal to 0 can indicate that the ultimate motion vector expression for affine mode cannot be used in the bitstream, for example, at the high-level. When the affine_umve_enable_flag is not present (e.g., not signaled in the syntax table (1500)), a value of the affine_umve_enable_flag can be inferred to be 0. A variable (or coding tool variable) AffineUmveEnableFlag can be set to equal to the affine_umve_enable_flag. In an example, the variable AffineUmveEnableFlag is not signaled and is derived from the affine_umve_enable_flag. In an example, the variable AffineUmveEnableFlag can be modified, and the affine_umve_enable_flag is not modified.

The etmvp_enable_flag can indicate whether the enhanced temporal motion vector prediction may be used in the bitstream, for example, at the high-level (e.g., the SPS level for the video sequence). The etmvp_enable_flag being equal to 1 can indicate that the enhanced temporal motion vector prediction for affine mode may be used in the bitstream, for example, at the high-level. The etmvp_enable_flag being equal to 0 can indicate that the enhanced temporal motion vector prediction cannot be used in the bitstream, for example, at the high-level. When the etmvp_enable_flag is not present (e.g., not signaled in the syntax table (1500)), a value of the etmvp_enable_flag can be inferred to be 0. A variable (or coding tool variable) EtmvpEnableFlag can be set to equal to the etmvp_enable_flag. In an example, the variable EtmvpEnableFlag is not signaled and is derived from the etmvp_enable_flag. In an example, the variable EtmvpEnableFlag can be modified, and the etmvp_enable_flag is not modified.

The subtmvp_enable_flag can indicate whether the subblock based temporal motion vector prediction may be used in the bitstream, for example, at the high-level (e.g., the SPS level for the video sequence). The subtmvp_enable_flag being equal to 1 can indicate that the subblock based temporal motion vector prediction for affine mode may be used in the bitstream, for example, at the high-level. The subtmvp_enable_flag being equal to 0 can indicate that the subblock based temporal motion vector prediction cannot be used in the bitstream, for example, at the high-level. When the subtmvp_enable_flag is not present (e.g., not signaled in the syntax table (1500)), a value of the subtmvp_enable_flag can be inferred to be 0. A variable (or coding tool variable) SubTmvpEnableFlag can be set to equal to the subtmvp_enable_flag. In an example, the variable SubTmvpEnableFlag is not signaled and is derived from the subtmvp_enable_flag. In an example, the variable SubTmvpEnableFlag can be modified, and the subtmvp_enable_flag is not modified.

The st_chroma_enable_flag can indicate whether the chroma secondary transform may be used in the bitstream, for example, at the high-level (e.g., the SPS level for the video sequence). The st_chroma_enable_flag being equal to 1 can indicate that the chroma secondary transform may be used in the bitstream, for example, at the high-level. The st_chroma_enable_flag being equal to 0 can indicate that the chroma secondary transform cannot be used in the bitstream, for example, at the high-level. When the st_chroma_enable_flag is not present (e.g., not signaled in the syntax table (1500)), a value of the st_chroma_enable_flag can be inferred to be 0. A variable (or coding tool variable) StChromaEnableFlag can be set to equal to the st_chroma_enable_flag. In an example, the variable StChromaEnableFlag is not signaled and is derived from the st_chroma_enable_flag. In an example, the variable StChromaEnableFlag can be modified, and the st_chroma_enable_flag is not modified.

The ipf_chroma_enable_flag can indicate whether the chroma intra prediction filtering may be used in the bitstream, for example, at the high-level (e.g., the SPS level for the video sequence). The ipf_chroma_enable_flag being equal to 1 can indicate that the chroma intra prediction filtering may be used in the bitstream, for example, at the high-level. The ipf_chroma_enable_flag being equal to 0 can indicate that the chroma intra prediction filtering cannot be used in the bitstream, for example, at the high-level. When the ipf_chroma_enable_flag is not present (e.g., not signaled in the syntax table (1500)), a value of the ipf_chroma_enable_flag can be inferred to be 0. A variable (or coding tool variable) IpfChromaEnableFlag can be set to equal to the ipf_chroma_enable_flag. In an example, the variable IpfChromaEnableFlag is not signaled and is derived from the ipf_chroma_enable_flag. In an example, the variable IpfChromaEnableFlag can be modified, and the ipf_chroma_enable_flag is not modified.

The ealf_enable_flag can indicate whether the enhanced adaptive loop filtering may be used in the bitstream, for example, at the high-level (e.g., the SPS level for the video sequence). The ealf_enable_flag being equal to 1 can indicate that the enhanced adaptive loop filtering may be used in the bitstream, for example, at the high-level. The ealf_enable_flag being equal to 0 can indicate that the enhanced adaptive loop filtering cannot be used in the bitstream, for example, at the high-level. When the ealf_enable_flag is not present (e.g., not signaled in the syntax table (1500)), a value (or coding tool variable) of the ealf_enable_flag can be inferred to be 0. A variable EalfEnableFlag can be set to equal to the ealf_enable_flag. In an example, the variable EalfEnableFlag is not signaled and is derived from the ealf_enable_flag. In an example, the variable EalfEnableFlag can be modified, and the ealf_enable_flag is not modified.

The sp_enable_flag can indicate whether the secondary prediction for affine mode may be used in the bitstream, for example, at the high-level (e.g., the SPS level for the video sequence). The sp_enable_flag being equal to 1 can indicate that the secondary prediction for affine mode may be used in the bitstream, for example, at the high-level. The sp_enable_flag being equal to 0 can indicate that the secondary prediction for affine mode cannot be used in the bitstream, for example, at the high-level. When the sp_enable_flag is not present (e.g., not signaled in the syntax table (1500)), a value of the sp_enable_flag can be inferred to be 0. A variable (or coding tool variable) SpEnableFlag can be set to equal to the sp_enable_flag. In an example, the variable SpEnableFlag is not signaled and is derived from the sp_enable_flag. In an example, the variable SpEnableFlag can be modified, and the sp_enable_flag is not modified.

The iip_enable_flag can indicate whether an improved intra prediction mode may be used in the bitstream, for example, at the high-level (e.g., the SPS level for the video sequence). The iip_enable_flag being equal to 1 can indicate that the improved intra prediction mode may be used in the bitstream, for example, at the high-level. The iip_enable_flag being equal to 0 can indicate that the improved intra prediction mode cannot be used in the bitstream, for example, at the high-level. When the iip_enable_flag is not present (e.g., not signaled in the syntax table (1500)), a value of the iip_enable_flag can be inferred to be 0. A variable (or coding tool variable) IipEnableFlag can be set to equal to the iip_enable_flag. In an example, the variable IipEnableFlag is not signaled and is derived from the iip_enable_flag. In an example, the variable IipEnableFlag can be modified, and the iip_enable_flag is not modified.

The ibc_enable_flag can indicate whether an intra block copy (IBC) mode may be used in the bitstream, for example, at the high-level (e.g., the SPS level for the video sequence). The ibc_enable_flag being equal to 1 can indicate that the IBC mode may be used in the bitstream, for example, at the high-level. The ibc_enable_flag being equal to 0 can indicate that the IBC mode cannot be used in the bitstream, for example, at the high-level. When the ibc_enable_flag is not present (e.g., not signaled in the syntax table (1500)), a value of the ibc_enable_flag can be inferred to be 0. A variable (or coding tool variable) IbcEnableFlag can be set to equal to the ibc_enable_flag. In an example, the variable IbcEnableFlag is not signaled and is derived from the ibc_enable_flag.

In an example, the variable IbcEnableFlag can be modified, and the ibc_enable_flag is not modified.

The ibc_enable_flag can indicate whether an intra string copy mode may be used in the bitstream, for example, at the high-level (e.g., the SPS level for the video sequence). The ibc_enable_flag being equal to 1 can indicate that the intra string copy mode may be used in the bitstream, for example, at the high-level. The ibc_enable_flag being equal to 0 can indicate that the intra string copy mode cannot be used in the bitstream, for example, at the high-level. When the ibc_enable_flag is not present (e.g., not signaled in the syntax table (1500)), a value of the isc_enable_flag can be inferred to be 0. A variable (or coding tool variable) IbcEnableFlag can be set to equal to the ibc_enable_flag. In an example, the variable IbcEnableFlag is not signaled and is derived from the ibc_enable_flag. In an example, the variable IbcEnableFlag can be modified, and the ibc_enable_flag is not modified.

The fimc_enable_flag can indicate whether a frequency based intra mode coding may be used in the bitstream, for example, at the high-level (e.g., the SPS level for the video sequence). The fimc_enable_flag being equal to 1 can indicate that the frequency based intra mode coding may be used in the bitstream, for example, at the high-level. The fimc_enable_flag being equal to 0 can indicate that the frequency based intra mode coding cannot be used in the bitstream, for example, at the high-level. When the fimc_enable_flag is not present (e.g., not signaled in the syntax table (1500)), a value of the fimc_enable_flag can be inferred to be 0. A variable (or coding tool variable) FimcEnableFlag can be set to equal to the fimc_enable_flag. In an example, the variable FimcEnableFlag is not signaled and is derived from the fimc_enable_flag. In an example, the variable FimcEnableFlag can be modified, and the fimc_enable_flag is not modified.

The ists_enable_flag can indicate whether an implicit signaled transform skip mode may be used in the bitstream, for example, at the high-level (e.g., the SPS level for the video sequence). The ists_enable_flag being equal to 1 can indicate that the implicit signaled transform skip mode may be used in the bitstream, for example, at the high-level. The ists_enable_flag being equal to 0 can indicate that the implicit signaled transform skip mode cannot be used in the bitstream, for example, at the high-level. When the ists_enable_flag is not present (e.g., not signaled in the syntax table (1500)), a value of the ists_enable_flag can be inferred to be 0. A variable (or coding tool variable) IstsEnableFlag can be set to equal to the ists_enable_flag. In an example, the variable IstsEnableFlag is not signaled and is derived from the ists_enable_flag. In an example, the variable IstsEnableFlag can be modified, and the ists_enable_flag is not modified.

In some examples, whether to signal an enabling flag (e.g., the affine_umve_enable_flag) for a respective coding tool can depend on one or more additional conditions. The one or more additional conditions can include whether other coding tool(s) may be used in the bitstream. A box (1510) in FIG. 15A shows that whether to signal the affine_umve_enable_flag depends on two variables AffineEnableFlag and UmveEnableFlag. In an example, the variable AffineEnableFlag can indicate whether an affine mode may be used in the bitstream, and the variable UmveEnableFlag can indicate whether an ultimate motion vector expression may be used in the bitstream.

As described above, the syntax table (1500) can correspond to the suitable HLS at the suitable high-level. For example, the syntax table (1500) can be an SPS syntax table. Similarly, picture-level enabling flags may be signaled in a picture header (or a slice header) for a picture to determine if coding tools associated with the picture-level enabling flags can be used for the picture.

A value of a lower level enabling flag (e.g., a picture-level enabling flag) for a coding tool can depend on a value of a higher level enabling flag (e.g., a sequence-level enabling flag or an SPS flag) for the same coding tool. In some examples, the value of the lower level enabling flag (e.g., the picture-level enabling flag) for the coding tool can depend on the value of the higher level enabling flag (e.g., the sequence-level enabling flag or the SPS flag) for the same coding tool and one or more additional conditions. As described above with reference to the box (1510) in FIG. 15A, the one or more additional conditions can include whether other coding tool(s) may be used in the bitstream.

Accordingly, if the higher level enabling flag (e.g., the sequence-level enabling flag or the SPS flag) indicates that the coding tool cannot be used in the bitstream, the value of the corresponding picture-level enabling flag is not signaled and can be inferred to be 0. Alternatively, the corresponding picture-level enabling flag can be signaled and the value of the corresponding picture-level enabling flag that is signaled is 0.

The above description can be suitably adapted to any suitable high levels, such as a PPS, a slice, a tile group, a tile, a CTU, or any suitable sub-picture level that is higher than a block level. In an example, slice level enabling flags may be signaled in a slice header for a slice in the picture to determine if coding tools associated with the slice-level enabling flags can be used for the slice.

In some examples, certain common syntax elements that are signaled at each slice header for each slice in a picture can be put in a picture header for the picture if the certain common syntax elements do not vary from one slice to another slice, for example, in a majority of application scenarios.

When a plurality of coding tools are not effective for coding a certain type of video content (e.g., a video, a picture), the plurality of coding tools can be disabled. In an example, each of the plurality of coding tools is disabled individually. On the other hand, it is challenging to identify a relationship between usability of a coding tool and a particular video or a type of the video.

Screen content can refer to a type of content (e.g., a video content) that includes computer generated content, such as computer generated text, graphics, animations, and/or the like. A screen content video can include the screen content described above, such as computer generated text, graphics, animations, and/or the like. In some examples, screen content can refer to a mixture of computer generated content (e.g., computer generated text, graphics, animations, and/or the like) and camera-captured content (e.g., a camera-captured video). In some examples, a screen content video can include camera-captured content (e.g., a camera-captured video) in addition to computer generated content.

A screen content video can exhibit distinct characteristics compared to a camera-captured video. In various embodiments, a screen content video (e.g., including computer generated content) can be non-noisy, have sharp edges, and/or have multiple repeated patterns. For example, repeated patterns in text and graphics rich content occur frequently within a same picture of a screen content video. Having a previously reconstructed block in a picture with equal or similar pattern as a predictor to predict a block in the picture can effectively reduce prediction error and therefore improve coding efficiency in a screen content video.

As screen content can have distinct characteristics from those of camera-captured content, video coding tools primarily developed for camera-captured videos may not be as efficient when the video coding tools are applied to screen content videos. Further, the SCC tools can be developed to code screen content videos more efficiently than the video coding tools primarily developed for camera-captured videos. For a typical screen content video with text and graphics, a same picture can include repetitive patterns. Hence, the IBC mode as described with reference to FIGS. 9-11 and 12A-12D and the string copy mode described with reference to FIG. 13 can be effective.

The SCC tools can include the frequency based intra mode coding and the transform skip (TS) mode that are suitable for screen content.

In recently developed video coding standards, including AVS3, SCC tools that support the screen content are added. The SCC tools can include any suitable coding tools for coding the screen content. For example, the SCC tools include a combination of the IBC mode, the string copy mode, the frequency based intra mode coding, the TS mode, and the like. The SCC tools can be efficient in coding screen content videos. As described above, the coding tools designed to handle camera-capture content or videos may not be effective for compressing screen content videos. When the coding tools designed to handle camera-capture content or videos are ineffective in coding the screen content videos, the coding tools designed to handle the camera-capture content can be turned off, for example, to save encoder runtime. In various examples, high-level enabling flag(s) of the coding tools are to be disabled individually. Therefore, it is advantageous to design a syntax structure in the HLS to disable a plurality of coding tools simultaneously, for example by disabling syntax elements of the plurality of coding tools. Disabling the plurality of coding tools simultaneously instead of individually can save encoder runtime and thus improve coding efficiency. For example, when the plurality of coding tools is turned off simultaneously, the encoder do not need to examine the usefulness of the plurality of coding tools, and thus can save the encoder runtime. While examples are described for screen content video and camera-captured videos, it is noted that a plurality of coding tools for other types of video or other criteria may be turned off simultaneously in other embodiments of this disclosure.

As described above, the high-level can correspond to a video sequence, one or more pictures, a picture, a slice, a tile group, a tile, a CTU, or the like. According to aspects of the disclosure, the high-level can refer to a sequence level, a picture level, or a sub-picture level. The sub-picture level can refer to a slice level, a tile level, a tile group level, a CTU level, or the like. In an example, the high-level is a level higher than the block-level (or the block level). A high-level control flag can include, but is not limited to, a flag signaled in one or a combination of high-levels: a SPS, a PPS, a picture header, a slice header, a tile, a tile group, the sub-picture level, the CTU level, and the like.

In general, coding tool enabling flags (e.g., the eipm_enable_flag) can be indicated (e.g., signaled or inferred) in any suitable syntax structure (e.g., the SPS syntax table (1500)) corresponding to any suitable level (e.g., the sequence level as described with reference to FIGS. 15A-15B). The coding tool enabling flags can indicate whether respective coding tools may be used for at least one block for the suitable level in the bitstream. Each of the coding tool enabling flags for the respective coding tool can have different syntax at different levels. For example, for the extended intra prediction mode, the syntax elements ph_eipm_enable_flag and sps_eipm_enable_flag can be used at the picture level and the sequence level, respectively. Alternatively, each of the coding tool enabling flags can have a same syntax at the different levels. The coding tool enabling flags can include the first set of coding tool enabling flags for coding the camera-captured content and the second set of coding tool enabling flags for coding the screen content.

According to aspects of the disclosure, the first set of coding tool enabling flags for coding the camera-captured content can include but is not limited to the flags: the eipm_enable_flag, the dmvr_enable_flag, the bio_enable_flag, the affine_umve_enable_flag, the etmvp_enable_flag, the subtmvp_enable_flag, the st_chroma_enable_flag, the ipf_chroma_enable_flag, the ealf_enable_flag, the sp_enable_flag, the iip_enable_flag, and/or the like.

In an embodiment, the first set of coding tool enabling flags can be indicated (e.g., signaled or inferred) in any suitable HLS corresponding to any suitable high-level, such as the sequence level as described with reference to FIGS. 15A-15B. One of the first set of coding tool enabling flags can be signaled in the HLS (e.g., the SPS). Alternatively, the one of the first set of coding tool enabling flags is not signaled and is inferred. Each of the first set of coding tool enabling flags for the respective coding tool can have different syntax at different levels. For example, for the extended intra prediction mode, the syntax elements ph_eipm_enable_flag and sps_eipm_enable_flag can be used at the picture level and the sequence level, respectively. Alternatively, each of the first set of coding tool enabling flags for the respective coding tool can have a same syntax at the different levels. For example, for the extended intra prediction mode, the same syntax element eipm_enable_flag can be used at the picture level and the sequence level. In some embodiments, the first set of coding tool enabling flags can be signaled in the SPS as SPS flag(s) or in the picture header as picture header flag(s).

The SCC tools can include, but are not limited to, a combination of the IBC mode, the string copy mode, the frequency based intra mode coding, the implicit signaled TS mode, and/or the like. According to aspects of the disclosure, the second set of coding tool enabling flags for coding the screen content can include but is not limited to the flags: the ibc_enable_flag, the isc_enable_flag, the fimc_enable_flag, the ists_enable_flag, and/or the like.

In an embodiment, the second set of coding tool enabling flags can be indicated (e.g., signaled or inferred) in any suitable HLS corresponding to any suitable high-level, such as the sequence level as described with reference to FIGS. 15A-15B. One of the second set of coding tool enabling flags can be signaled in the HLS (e.g., the SPS). Alternatively, the one of the second set of coding tool enabling flags is not signaled and is inferred. Each of the second set of coding tool enabling flags for the respective coding tool can have different syntax at different levels. Alternatively, each of the second set of coding tool enabling flags for the respective coding tool can have a same syntax at the different levels. In some embodiments, the second set of coding tool enabling flags can be signaled in the SPS as SPS flag(s) or in the picture header as picture header flag(s).

A first coding tool enabling flag (e.g., a sps_eipm_enable_flag) for a coding tool (e.g., the extended intra prediction mode) at a higher level (e.g., a SPS) can be used to determine whether a second coding tool enabling flag (e.g., a ph_eipm_enable_flag) for the coding tool at a lower level (e.g., a picture header) is to be signaled. The higher level is higher than the lower level. If the first coding tool enabling flag is a first value (e.g., a value 0), the second coding tool enabling flag (i) is not signaled and is inferred to be the first value or (ii) the second coding tool enabling flag is signaled as the first value. If the first coding tool enabling flag is a second value (e.g., a value 1), the second coding tool enabling flag (i) can be signaled as either the first value or the second value or (ii) can be inferred to be the first value.

In an example, the first coding tool enabling flag (e.g., the sps_eipm_enable_flag) in the SPS is 0, and thus the second coding tool enabling flag (e.g., the_ph_eipm_enable_flag) in the picture header is inferred to be 0. If the second coding tool enabling flag (e.g., the ph_eipm_enable_flag) in the picture header is 0, a corresponding coding tool flag at a block level is inferred to be 0.

In an example, the first coding tool enabling flag (e.g., the sps_eipm_enable_flag) in the SPS is 1, and thus the second coding tool enabling flag (e.g., the ph_eipm_enable_flag) in the picture header is signaled as 0 or 1. If the second coding tool enabling flag (e.g., the ph_eipm_enable_flag) in the picture header is 1, the corresponding coding tool flag at the block level is signaled as 0 or 1.

According to aspects of the disclosure, coding information for a plurality of blocks can be decoded from a coded video bitstream. The coding information can indicate a high-level control flag for the plurality of blocks. The high-level control flag can indicate whether a plurality of coding tools is disabled for at least one of the plurality of blocks. The at least one of the plurality of blocks includes a current block. Whether the plurality of coding tools is disabled for the at least one of the plurality of blocks can be determined based on the high-level control flag. Subsequently, the current block can be reconstructed without the plurality of coding tools based on the plurality of coding tools being determined as disabled.

In an embodiment, the plurality of coding tools includes the first set of coding tools or the camera-captured content coding tools that are different from the SCC tools. The high-level control flag can be a scc_only_enable_flag. A first value (e.g., being true or having a value of 1) of the high-level control flag can indicate that the plurality of coding tools (e.g., the camera-captured content coding tools) is disabled for the at least one of the plurality of coding blocks. In an example, the first value of the high-level control flag indicates that only the SCC tools are allowable for the at least one of the plurality of coding blocks. A second value (e.g., being false or having a value of 0) of the high-level control flag can indicate that the plurality of coding tools (e.g., the camera-captured content coding tools) is not disabled (e.g., can be allowable) for the at least one of the plurality of coding blocks.

While the first set of coding tools or the camera-captured content coding tools is described as an example of the plurality of coding tools, the plurality of coding tools can include any suitable set of coding tools or coding modes and can be turned off simultaneously, for example, for the at least one of the plurality of blocks by a high-level syntax element, such as a suitable high-level control flag according to aspects of the disclosure. In an embodiment, the SCC tools is turned off simultaneously by a high-level syntax element. For example, if the at least one of the plurality of blocks includes camera-captured content and the SCC tools may not be efficient for coding the camera-captured content, the SCC tools can be disabled simultaneously for the at least one of the plurality of blocks and the camera-captured content coding tools may be used to code the at least one of the plurality of blocks. Other sets of tools may be turned off simultaneously in similar manners.

The high-level control flag can be signaled in one of a SPS, a PPS, a picture header, a slice header, a tile group level, and a tile level.

In an embodiment, the high-level control flag indicates that the plurality of coding tools is disabled for the at least one of the plurality of blocks, and the plurality of coding tools can be determined to be disabled for the at least one of the plurality of blocks.

In an embodiment, the high-level control flag indicates that the plurality of coding tools can be allowable for the at least one of the plurality of blocks. Thus, for each of the plurality of coding tools, such as those described in FIGS. 15A-15B, whether the coding tool (e.g., the extended intra prediction mode) is allowed for the at least one of the plurality of blocks can be determined based on a respective indicator for the coding tool. The respective indicator can refer to a coding tool enabling flag (e.g., the eipm_enable_flag) or a respective coding tool variable (e.g., the EipmEnableFlag), such as those described with reference to FIGS. 15A-15B. The respective indicator for each of the plurality of coding tools can indicate whether the coding tool is allowable for the at least one of the plurality of blocks.

In an embodiment, the high-level control flag in a SPS (or a sequence header) for a video sequence can indicate whether the plurality of coding tools is disabled for the plurality of blocks in the video sequence. The plurality of coding tools can be determined to be disabled for the plurality of blocks in the video sequence if the high-level control flag indicates that the plurality of coding tools is disabled for the plurality of blocks in the video sequence. The high-level control flag can be signaled in the SPS for the video sequence.

The high-level control flag (e.g., the scc_only_enable_flag) can be in the sequence header (or the SPS) indicating that the plurality of coding tools is not needed for the video sequence and low-level coding layers (e.g., a current picture in the video sequence, the at least one block in the plurality of blocks) covered by the sequence header or the SPS.

In an example, when the high-level control flag (e.g., the scc_only_enable_flag) is equal to 1, the plurality of coding tools is not needed for coding the video sequence. Therefore, coding tool enabling flags or coding tool variables for the plurality of coding tools are to be set or inferred to the value 0 for coding the video sequence. In an example, an encoder and a decoder can set the coding tool enabling flags or the coding tools variables. When the high-level control flag (e.g., the scc_only_enable_flag) is equal to 0, usages of the plurality of coding tools can be determined based on the respective coding tool enabling flags and/or other condition(s). As described above with reference to the box (1510) in FIG. 15A, in an example, the other conditions can include whether other coding tool(s) are used. The high-level control flag (e.g., the scc_only_enable_flag) can be signaled at the sequence header or the SPS, for example, prior to any of the coding tool enabling flags for the plurality of coding tools.

In an example, the high-level control flag is referred to as the scc_only_enable_flag. FIG. 16 shows a syntax table (1600), for example, in the SPS according to an embodiment of the disclosure and semantics can be described as follows. For illustration purposes, FIG. 16 shows the first set of coding tool enabling flags for the first set of coding tools. Whether the first set of coding tool enabling flags is signaled can depend on the high-level control flag (e.g., the scc_only_enable_flag), as indicated by boxes (1610)-(1611).

A variable (or a high-level control variable) (e.g., SccOnlyEnableFlag) can be set to equal to the high-level control flag (e.g., the scc_only_enable_flag). In an example, the high-level control flag (e.g., the scc_only_enable_flag) being equal to 1 (or being True) can indicate that related syntax elements (e.g., the first set of coding tool enabling flags) in the HLS (e.g., the SPS) are not signaled in the bitstream. For example, the scc_only_enable_flag is 1, and the high-level control variable (e.g., the SccOnlyEnableFlag) is set to the scc_only_enable_flag. Thus, the SccOnlyEnableFlag is 1. Then, !SccOnlyEnableFlag is 0. Accordingly, the related syntax elements (e.g., the first set of coding tool enabling flags) between the boxes (1610)-(1611) are not signaled.

The high-level control flag (e.g., the scc_only_enable_flag) being equal to 0 can indicate that the related syntax elements (e.g., the first set of coding tool enabling flags) may be signaled in the bitstream. Referring to FIG. 16, the eipm_enable_flag, the dmvr_enable_flag, the bio_enable_flag, the etmvp_enable_flag, the subtmvp_enable_flag, and the iip_enable_flag are signaled when the scc_only_enable_flag is 0.

Whether other flags of the first set of coding tool enabling flags, such as the affine_umve_enable_flag, the st_chroma_enable_flag, the ipf_chroma_enable_flag, the ealf_enable_flag, and the sp_enable_flag, are signaled can be further determined based on other conditions indicated by boxes (1621)-(1622). As described above with reference to the box (1510), the other conditions can include whether other coding tool(s) may be used. Detailed descriptions are omitted for purposes of brevity. Referring to the box (1622), if a variable SecondaryTransformEnableFlag is 1 indicating that a secondary transform can be used, the st_chroma_enable_flag is signaled. Otherwise, if the variable SecondaryTransformEnableFlag is 0 indicating that the secondary transform is disabled, the st_chroma_enable_flag is not signaled.

When the high-level control flag (e.g., the scc_only_enable_flag) is not present in the bitstream, a value of the high-level control flag (e.g., the scc_only_enable_flag) can be inferred to be 0.

In an embodiment, the respective indicator for each of the plurality of coding tools can be determined based on the high-level control flag. In an example, the respective indicator is the coding tool variable (e.g., the EipmEnableFlag), for each of the plurality of coding tools, the coding tool variable can be determined based on the high-level control flag and a respective coding tool enabling flag for the respective coding tool where the respective coding tool enabling flag can be for the at least one of the plurality of blocks. For example, the coding tool variable (e.g., the EipmEnableFlag) is determined based on the respective coding tool enabling flag (e.g., the eipm_enable_flag) and a variable (e.g., the SccOnlyEnableFlag) for the high-level control flag (e.g., the scc_only_enable_flag). In an example, the coding tool enabling flag (e.g., the eipm_enable_flag) is in a picture header, and thus the coding tool variable (e.g., the EipmEnableFlag) is a picture header variable.

In an embodiment, the respective indicator for each of the plurality of coding tools can be set to a value of 0 indicating that the respective coding tool is disabled for the at least one of the plurality of blocks based on the high-level control flag indicating that the plurality of coding tools is disabled for the at least one of the plurality of blocks.

In an embodiment, the high-level control flag is indicated in a SPS or a picture header, and the respective indicator for each of the plurality of coding tools can be for a current picture that includes the at least one of the plurality of blocks.

In an embodiment, the high-level control flag in a picture header for a current picture can indicate whether the plurality of coding tools is disabled for the plurality of blocks in the current picture. The plurality of coding tools can be determined to be disabled for the plurality of blocks in the current picture based on the high-level control flag indicating that the plurality of coding tools is disabled for the plurality of blocks in the current picture. The high-level control flag can be signaled in the picture header for a current picture.

The high-level control flag (e.g., the scc_only_enable_flag) in the picture header can be used to indicate that the plurality of coding tools are not needed for the current picture and low-level coding layer(s) that are covered by the picture header. The high-level control flag (e.g., the scc_only_enable_flag) being equal to 1 can indicate that the plurality of coding tools is not needed for coding the current picture. Therefore, the coding tool enabling flags or the respective coding tool variables for the plurality of coding tools are to be set equal to zero for coding the current picture. The high-level control flag (e.g., the scc_only_enable_flag) being equal to 0 can indicate that usages of the plurality of coding tools can be determined based on the respective coding tool enabling flags and/or other conditions. As described above with reference to the box (1510) in FIG. 15A, in an example, the other conditions can include whether other coding tool(s) are used. The high-level control flag (e.g., the scc_only_enable_flag) can be signaled in the picture header, for example, prior to any of the coding tool enabling flags of the plurality of coding tools.

In an example, the high-level control flag is referred to as the scc_only_enable_flag. Semantics for the high-level control flag can be described as follows.

In an example, the high-level control flag (e.g., the scc_only_enable_flag) can be used to determine coding tool enabling flags (e.g., the first set of coding tool enabling flags) or coding tool variables (e.g., the coding tool variables corresponding to the first set of coding tool enabling flags) of respective coding tools or modes (e.g., the first set of coding tools). The high-level control flag (e.g., the scc_only_enable_flag) equaling to 1 can indicate that the respective coding tools cannot be used for the at least one of the plurality of blocks, for example, in a current picture. The high-level control flag (e.g., the scc_only_enable_flag) equaling to 0 can indicate that the respective coding tools may be used for the at least one of the plurality of blocks, for example, in the current picture. When the high-level control flag (e.g., the scc_only_enable_flag) is not present, the value of the high-level control flag (e.g., the scc_only_enable_flag) can be inferred to be 0. The high-level control variable (e.g., the SccOnlyEnableFlag) can be set to be the high-level control flag (e.g., the scc_only_enable_flag).

The above description with reference to FIG. 16 can be suitably adapted when the high-level control flag (e.g., the scc_only_enable_flag) in the picture header can be used to indicate whether the plurality of coding tools is disabled for the current picture and low-level coding layer(s) that are covered by the picture header.

In some embodiments, the plurality of coding tools includes the first set of coding tools (or the camera-captured coding tools). As described above, the coding tool variables for the camera-captured coding tools can be derived based on the high-level variable (e.g., the SccOnlyEnableFlag). The coding tool variable can be determined based on the respective coding tool enabling flag and the high-level control flag. The coding tool variable can be determined based on the respective coding tool enabling flag and the high-level variable (e.g., the SccOnlyEnableFlag) corresponding to the high-level control flag.

In an example, the coding tool variable EipmEnableFlag is determined based on the eipm_enable_flag and the high-level variable (e.g., the SccOnlyEnableFlag), as shown in Eq. 1. If the high-level variable is 1 and/or the eipm_enable_flag is 0, the coding tool variable EipmEnableFlag is 0. If the high-level variable is 0 and the eipm_enable_flag is 1, the coding tool variable EipmEnableFlag is 1.

EipmEnableFlag=eipm_enable_flG & !SccOnlyEnableFlag    Eq. 1.

The above description can be suitably adapted for the relationships between the coding tool variable and the respective coding tool enabling flag and the high-level variable, as shown in Eqs. 2-11.

$$DmvrEnableFlag = dmvr\_enable\_flag \ \& \ !SccOnlyEnableFlag \quad (Eq. 2)$$

$$BioEnableFlag = bio\_enable\_flag \ \& \ !SccOnlyEnableFlag \quad (Eq. 3)$$

$$AffineUmveEnableFlag = affine\_umve\_enable\_flag \ \& \ !SccOnlyEnableFlag \quad (Eq. 4)$$

$$EtmvpEnableFlag = etmvp\_enable\_flag \ \& \ !SccOnlyEnableFlag \quad (Eq. 5)$$

$$SubTmvpEnableFlag = subtmvp\_enable\_flag \ \& \ !SccOnlyEnableFlag \quad (Eq. 6)$$

$$StChromaEnableFlag = st\_chroma\_enable\_flag \ \& \ !SccOnlyEnableFlag \quad (Eq. 7)$$

$$IpfChromaEnableFlag = ipf\_chroma\_enable\_flag \ \& \ !SccOnlyEnableFlag \quad (Eq. 8)$$

$$EalfEnableFlag = ealf\_enable\_flag \ \& \ !SccOnlyEnableFlag \quad (Eq. 9)$$

$$SpEnableFlag = sp\_enable\_flag \ \& \ !SccOnlyEnableFlag \quad (Eq. 10)$$

$$IipEnableFlag = iip\_enable\_flag \ \& \ !SccOnlyEnableFlag \quad (Eq. 11)$$

In an embodiment, the high-level control flag (e.g., the scc_only_enable_flag) in the SPS or the picture header for the current picture can be used to derive a coding tool enabling flag or a respective coding tool variable of a coding tool at the picture level.

The high-level control flag (e.g., the scc_only_enable_flag) equaling to 1 can indicate that the plurality of coding tools is not needed for coding the current picture. Therefore, the coding tool enabling flags or the respective coding tool variables for the plurality of coding tools are to be set to be zero for coding the current picture. The high-level control flag (e.g., the scc_only_enable_flag) equaling to 0 can indicate that usages of the plurality of coding tools can be determined based on the respective coding tool enabling flags and/or other conditions. As described above with reference to the box (1510) in FIG. 15A, in an example, the other conditions can include whether other coding tool(s) are used. The high-level control flag (e.g., the scc_only_enable_flag) can be signaled in the picture header, for example, prior to any of the coding tool enabling flag (if any) for the plurality of coding tools.

In an example, the high-level control flag is referred to as the scc_only_enable_flag. Semantics for the high-level control flag can be described as follows.

In an example, the high-level control flag (e.g., the scc_only_enable_flag) can be used to determine coding tool enabling flags (e.g., the first set of coding tool enabling flags) or coding tool variables (e.g., the coding tool variables) corresponding to the first set of coding tool enabling flags) of respective coding tools or modes (e.g., the first set of coding tools). The high-level control flag (e.g., the scc_only_enable_flag) equaling to 1 can indicate that the respective coding tools cannot be used for the at least one of the plurality of blocks, for example, in a current picture. The high-level control flag (e.g., the scc_only_enable_flag) equaling to 0 can indicate that the respective coding tools may be used for the at least one of the plurality of blocks, for example, in the current picture. When the high-level control flag (e.g., the scc_only_enable_flag) is not present, the value of the high-level control flag (e.g., the scc_only_enable_flag) can be inferred to be 0. The high-level control variable (e.g., the SccOnlyEnableFlag) can be set to be the high-level control flag (e.g., the scc_only_enable_flag).

The above description with reference to FIG. 16 can be suitably adapted when the high-level control flag (e.g., the scc_only_enable_flag) in the SPS or the picture header can be used to indicate whether the plurality of coding tools is disabled for the current picture.

In an embodiment, if the high-level control variable (e.g., the SccOnlyEnableFlag) is equal to 1, the coding tools enabling flags for the plurality of coding tools at the picture header do not need to be signaled. Instead, the coding tools enabling flags may be inferred to be 0.

In an embodiment, one of the plurality of coding tools has a first coding tool enabling flag in the picture header (also referred to as a picture header enabling flag) and a second coding tool enabling flag (also referred to as an SPS enabling flag) in the SPS (or the SPS level). The coding tool variable of the one of the plurality of coding tools at the picture level can be derived based on existing conditions (e.g., the picture header enabling flag) and the value of the high-level variable (e.g., the SccOnlyEnableFlag).

For example, for the Extended Intra Prediction Mode, the picture header enabling flag for the Extended Intra Prediction Mode is a ph_eipm_enable_flag. The picture header enabling flag (e.g., the_ph_eipm_enable_flag) being equal to 1 can indicate that the extended intra prediction mode may be used in the current picture. The picture header enabling flag (e.g., the ph_eipm_enable_flag) being equal to 0 can indicate that the extended intra prediction mode cannot be used in the current picture. When the picture header enabling flag (e.g., the ph_eipm_enable_flag) is not present, a value of the picture header enabling flag (e.g., the ph_eipm_enable_flag) can be inferred to be 0. The coding tool variable (e.g., the EipmEnableFlag) can be set to equal to ph_eipm_enable_flag && !SccOnlyEnableFlag.

According to aspects of the disclosure, the high-level control flag can be indicated in the SPS or the picture header. The at least one of the plurality of blocks can be the current block. In an embodiment, whether to signal a respective block-level enabling flag for each of the plurality of coding tools that indicates whether the coding tool is allowable for the current block can be determined based on the high-level control flag.

In an embodiment, the high-level control flag can be used to indicate whether the plurality of coding tools is disabled for the current block. In an example, the high-level control flag is used to indicate that the plurality of coding tools is not needed for the block level syntax.

The high-level control flag being equal to 1 can indicate that the plurality of coding tools is not needed for coding the current block (e.g., a CB, a PB, or a TB). Therefore, block level coding tool flags for the plurality of coding tools are not be signaled. The high-level control flag being equal to 0 can indicate that usages of the plurality of coding tools can be determined based on the coding tool enabling flags and/or other conditions. In an example, the high-level control flag is signaled at the picture header.

In an embodiment, the high-level control flag is the scc_only_enable_flag. Semantics for the high-level control flag (e.g., the scc_only_enable_flag) can be described as below. The high-level control flag (e.g., the scc_only_enable_flag) can be used to determine the signaling of usage flags (or block-level flags) of coding tools at the block level for the current block. In an embodiment, a usage flag or a block-level flag of a coding tool indicates if the coding tool is used for the current block. The high-level control flag (e.g., the scc_only_enable_flag) being equal to 1 can indicate that the coding tools cannot be used in the current block. The high-level control flag (e.g., the scc_only_enable_flag) being equal to 0 can indicate that the coding tools may be used for the current block. When the high-level control flag (e.g., the scc_only_enable_flag) is not present, the value of the high-level control flag (e.g., the scc_only_enable_flag) can be inferred to be 0. The high-level control variable (e.g., the SccOnlyEnableFlag) corresponding to the high-level control flag (e.g., the scc_only_enable_flag) can be set equal to the high-level control flag (e.g., the scc_only_enable_flag).

FIGS. 17A-17B show exemplary syntax for a block-level flag according to embodiments of the disclosure. Referring to FIG. 17A, at the block level, whether to signal the block-level flag (e.g., an eipm_pu_flag) for the Extended Intra Prediction Mode is determined based on the coding tool variable (e.g., the EipmEnableFlag) for the Extended Intra Prediction Mode and a condition (e.g., IntraLumaPedModeIndex is larger than 1).

According to aspects of the disclosure, the syntax in FIG. 17A can be modified as shown in FIG. 17B. In FIG. 17B, at the block level, whether to signal the block-level flag (e.g., an eipm_pu_flag) for the Extended Intra Prediction Mode is determined based on the coding tool variable (e.g., the EipmEnableFlag) for the Extended Intra Prediction Mode, the condition (e.g., IntraLumaPedModeIndex is larger than 1), and the high-level control variable (e.g., the SccOnlyEnableFlag). In an example, the block-level flag (e.g., the eipm_pu_flag) indicates if the Extended Intra Prediction Mode is used for the block. If the high-level control variable (e.g., the SccOnlyEnableFlag) is 0, whether to signal the block-level flag (e.g., an eipm_pu_flag) for the Extended Intra Prediction Mode is determined based on the coding tool variable (e.g., the EipmEnableFlag) for the Extended Intra Prediction Mode and the condition (e.g., IntraLumaPedModeIndex is larger than 1), which is identical to that described in FIG. 17A. If the high-level control variable (e.g., the SccOnlyEnableFlag) is 1, the block-level flag (e.g., an eipm_pu_flag) for the Extended Intra Prediction Mode is determined not to be signaled regardless of the coding tool variable (e.g., the EipmEnableFlag) for the Extended Intra Prediction Mode and the condition (e.g., IntraLumaPedModeIndex is larger than 1), which is different from that described in FIG. 17A.

Figure 18:
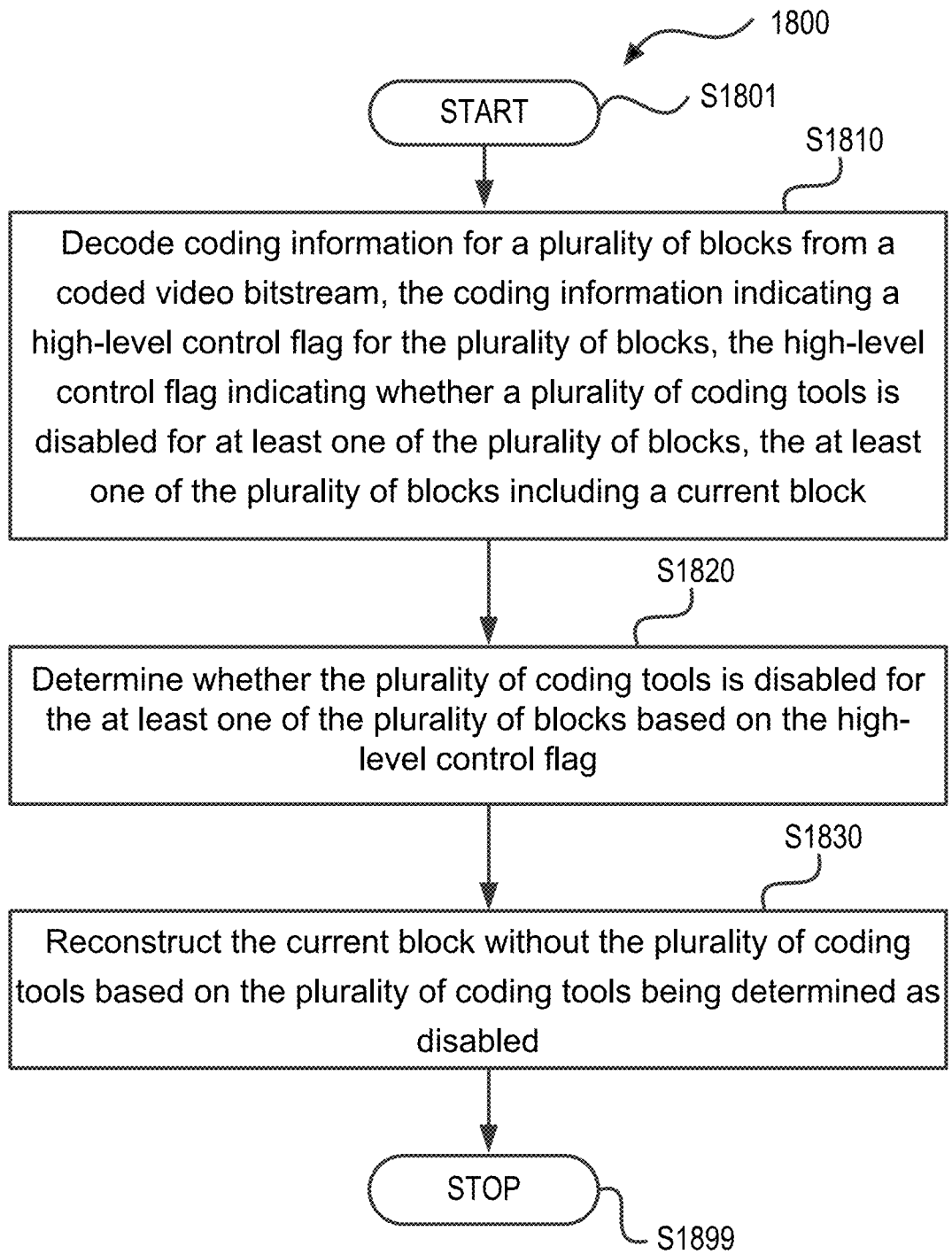
FIG. 18 shows a flow chart outlining a process (1800) according to an embodiment of the disclosure.

FIG. 18 shows a flow chart outlining a process (1800) according to an embodiment of the disclosure. The process (1800) can be used in the reconstruction of a block, such as a CB, a PB, a PU, a CU, a TB, a TU, or the like. In various embodiments, the process (1800) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1900) is implemented in software instructions, thus when the processing circuitry executes the software instructions, the processing circuitry performs the process (1800). The process starts at (S1801) and proceeds to (S1810).

At (S1810), coding information for a plurality of blocks from a coded video bitstream can be decoded. The coding information can indicate a high-level control flag for the plurality of blocks. The high-level control flag can indicate whether a plurality of coding tools is disabled for at least one of the plurality of blocks. The at least one of the plurality of blocks can include a current block.

The high-level control flag can be signaled in one of a SPS, a PPS, a picture header, a slice header, a tile group level, and a tile level.

The plurality of coding tools can include camera-captured content coding tools that are different from screen content coding (SCC) tools. The high-level control flag being a first value can indicate that only the SCC tools are allowable for the at least one of the plurality of coding blocks and the camera-captured content coding tools are disabled for the at least one of the plurality of coding blocks. The high-level control flag being a second value can indicate that the camera-captured content coding tools and the SCC tools are allowable for the at least one of the plurality of coding blocks.

At (S1820), whether the plurality of coding tools is disabled for the at least one of the plurality of blocks can be determined based on the high-level control flag.

In an example, the high-level control flag indicates that the plurality of coding tools is disabled for the at least one of the plurality of blocks, and the plurality of coding tools can be determined to be disabled for the at least one of the plurality of blocks.

In an example, the high-level control flag indicates that the plurality of coding tools is allowable for the at least one of the plurality of blocks, and for each of the plurality of coding tools, whether the coding tool is allowed for the at least one of the plurality of blocks can be determined based on a respective indicator for the coding tool.

In an embodiment, a respective indicator for each of the plurality of coding tools that indicates whether the respective coding tool is allowable for the at least one of the plurality of blocks can be determined based on the high-level control flag. In an example, the respective indicator is a variable. For each of the plurality of coding tools, the respective variable can be determined based on the high-level control flag and a respective enabling enable flag for the respective coding tool. The respective enabling enable flag can be for the at least one of the plurality of blocks. In an example, the respective indicator for each of the plurality of coding tools is set to a value of 0 indicating that the respective coding tool is disabled for the at least one of the plurality of blocks based on the high-level control flag indicating that the plurality of coding tools is disabled for the at least one of the plurality of blocks. In an example, the high-level control flag is indicated in a SPS or a picture header, and the respective indicator for each of the plurality of coding tools is for a current picture that includes the at least one of the plurality of blocks.

In an embodiment, the high-level control flag is signaled in the SPS for a video sequence and indicates whether the plurality of coding tools is disabled for the plurality of blocks in the video sequence. The plurality of coding tools can be determined to be disabled for the plurality of blocks in the video sequence based on the high-level control flag indicating that the plurality of coding tools is disabled for the plurality of blocks in the video sequence.

In an embodiment, the high-level control flag is signaled in the picture header for a current picture and indicates whether the plurality of coding tools is disabled for the plurality of blocks in the current picture. The plurality of coding tools can be determined to be disabled for the plurality of blocks in the current picture based on the high-level control flag indicating that the plurality of coding tools is disabled for the plurality of blocks in the current picture.

In an embodiment, the high-level control flag is indicated in a SPS or a picture header, and the at least one of the plurality of blocks is the current block. In an example, whether to signal a respective block-level enabling flag for each of the plurality of coding tools that indicates whether the coding tool is allowable for the current block can be determined based on the high-level control flag.

At (S1830), the current block can be reconstructed without the plurality of coding tools based on the plurality of coding tools being determined as disabled.

The process (1800) can be suitably adapted. Step(s) in the process (1800) can be modified and/or omitted. Additional step(s) can be added. Any suitable order of implementation can be used.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media. For example, FIG. 19 shows a computer system (1900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
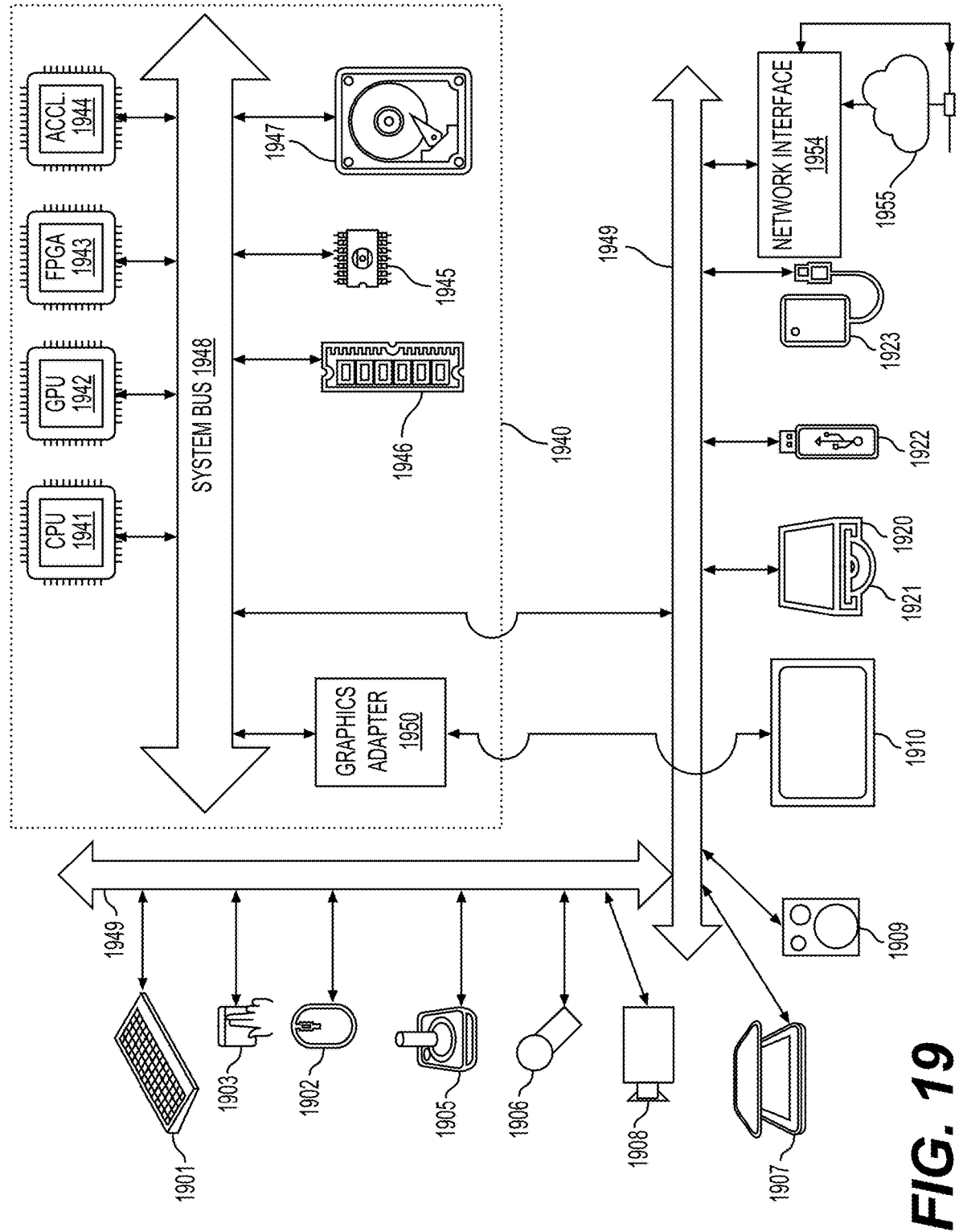
FIG. 19 is a schematic illustration of a computer system in accordance with an embodiment.

The components shown in FIG. 19 for computer system (1900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1900).

Computer system (1900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1901), mouse (1902), trackpad (1903), touch screen (1910), data-glove (not shown), joystick (1905), microphone (1906), scanner (1907), camera (1908).

Computer system (1900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1910), data-glove (not shown), or joystick (1905), but there can also be tactile feedback devices that do not serve as input devices), audio output devices (such as: speakers (1909), headphones (not depicted)), visual output devices (such as screens (1910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1900) can also include human accessible storage devices and their associated media such as optical media including CD/DVD ROM/RW (1920) with CD/DVD or the like media (1921), thumb-drive (1922), removable hard drive or solid state drive (1923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1900) can also include an interface (1954) to one or more communication networks (1955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1949) (such as, for example USB ports of the computer system (1900)); others are commonly integrated into the core of the computer system (1900) by attachment to a system bus as described below (for example Ethernet interface into a PC computer system or cellular network interface into a smartphone computer system). Using any of these networks, computer system (1900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1940) of the computer system (1900).

The core (1940) can include one or more Central Processing Units (CPU) (1941), Graphics Processing Units (GPU) (1942), specialized programmable processing units in the form of Field Programmable Gate Areas (FPGA) (1943), hardware accelerators for certain tasks (1944), graphics adapters (1950), and so forth. These devices, along with Read-only memory (ROM) (1945), Random-access memory (1946), internal mass storage such as internal non-user accessible hard drives, SSDs, and the like (1947), may be connected through a system bus (1948). In some computer systems, the system bus (1948) can be accessible in the form of one or more physical plugs to enable extensions by additional CPUs, GPU, and the like. The peripheral devices can be attached either directly to the core's system bus (1948), or through a peripheral bus (1949). In an example, the screen (1910) can be connected to the graphics adapter (2150). Architectures for a peripheral bus include PCI, USB, and the like.

CPUs (1941), GPUs (1942), FPGAs (1943), and accelerators (1944) can execute certain instructions that, in combination, can make up the aforementioned computer code. That computer code can be stored in ROM (1945) or RAM (1946). Transitional data can be also be stored in RAM (1946), whereas permanent data can be stored for example, in the internal mass storage (1947). Fast storage and retrieve to any of the memory devices can be enabled through the use of cache memory, that can be closely associated with one or more CPU (1941), GPU (1942), mass storage (1947), ROM (1945), RAM (1946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1900), and specifically the core (1940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1940) that are of non-transitory nature, such as core-internal mass storage (1947) or ROM (1945). The software implementing various embodiments of the present disclosure can be stored in such devices and executed by core (1940). A computer-readable medium can include one or more memory devices or chips, according to particular needs. The software can cause the core (1940) and specifically the processors therein (including CPU, GPU, FPGA, and the like) to execute particular processes or particular parts of particular processes described herein, including defining data structures stored in RAM (1946) and modifying such data structures according to the processes defined by the software. In addition or as an alternative, the computer system can provide functionality as a result of logic hardwired or otherwise embodied in a circuit (for example: accelerator (1944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding coding information for a plurality of blocks from a coded video bitstream, the coding information indicating a first high-level control flag for the plurality of blocks, the first high-level control flag indicating whether a plurality of camera-captured content coding tools is disabled for at least one of the plurality of blocks, the at least one of the plurality of blocks including a current block;

in response to a determination that the first high-level control flag indicates that the plurality of camera-captured content coding tools are enabled,
  decoding, from the coding information, a plurality of second high-level control flags, each of the second high-level control flags indicating whether a different one of the plurality of camera-captured content coding tools is enabled; and
  determining whether each of the plurality of camera-captured content coding tools is disabled for the at least one of the plurality of blocks based on the plurality of second high-level control flags;
in response to a determination that the first high-level control flag indicates that the plurality of camera-captured content coding tools are disabled, determining that all of the plurality of camera-captured content coding tools are disabled without dependency on the second high-level control flags; and
reconstructing the current block based on the determination of whether each of the plurality of camera-captured content coding tools is disabled.

2. The method of claim 1, wherein
the first high-level control flag indicates that the plurality of camera-captured content coding tools are enabled for the at least one of the plurality of blocks, and
the method comprises determining, for each of the plurality of camera-captured content coding tools, whether the respective camera-captured content coding tool is enabled for the at least one of the plurality of blocks based on a respective second high-level control flag for the respective camera-captured content coding tool.

3. The method of claim 1, wherein
the plurality of camera-captured content coding tools are different from screen content coding (SCC) tools,
the first high-level control flag being a first value indicates that only the SCC tools are enabled for the at least one of the plurality of blocks and the camera-captured content coding tools are disabled for the at least one of the plurality of blocks, and
the first high-level control flag being a second value indicates that the camera-captured content coding tools and the SCC tools are enabled for the at least one of the plurality of blocks.

4. The method of claim 1, further comprising:
determining, based on the first high-level control flag, a respective indicator for each of the plurality of camera-captured content coding tools that indicates whether the respective camera-captured content coding tool is enabled for the at least one of the plurality of blocks.

5. The method of claim 4, wherein
the respective indicator is a variable, and
the determining the respective indicator further includes determining, for each of the plurality of camera-captured content coding tools, the respective variable based on the first high-level control flag and a respective second high-level control flag for the respective camera-captured content coding tool, the respective second high-level control flag being for the at least one of the plurality of blocks.

6. The method of claim 4, wherein the respective indicator for each of the plurality of camera-captured content coding tools is set to a value of 0 indicating that the respective camera-captured content coding tool is disabled for the at least one of the plurality of blocks based on the first high-level control flag indicating that the plurality of camera-captured content coding tools is disabled for the at least one of the plurality of blocks.

7. The method of claim 4, wherein
the first high-level control flag is indicated in a sequence parameter set (SPS) or a picture header, and
the respective indicator for each of the plurality of camera-captured content coding tools is for a current picture that includes the at least one of the plurality of blocks.

8. The method of claim 1, wherein
the first high-level control flag is signaled in a sequence parameter set (SPS) for a video sequence and indicates whether the plurality of camera-captured content coding tools is disabled for the plurality of blocks in the video sequence, and
the method comprises determining that the plurality of camera-captured content coding tools is disabled for the plurality of blocks in the video sequence based on the first high-level control flag indicating that the plurality of camera-captured content coding tools is disabled for the plurality of blocks in the video sequence.

9. The method of claim 1, wherein
the first high-level control flag is signaled in a picture header for a current picture and indicates whether the plurality of camera-captured content coding tools is disabled for the plurality of blocks in the current picture, and
the method comprises determining that the plurality of camera-captured content coding tools is disabled for the plurality of blocks in the current picture based on the first high-level control flag indicating that the plurality of camera-captured content coding tools is disabled for the plurality of blocks in the current picture.

10. The method of claim 1, wherein
the first high-level control flag is indicated in a sequence parameter set (SPS) or a picture header, and
the at least one of the plurality of blocks is the current block.

11. The method of claim 10, wherein the method further comprises:
determining, based on the first high-level control flag, whether a respective block-level enabling flag is signaled for each of the plurality of camera-captured content coding tools that indicates whether the respective camera-captured content coding tool is enabled for the current block.

12. The method of claim 1, wherein the first high-level control flag is signaled in one of a sequence parameter set (SPS), a picture parameter set (PPS), a picture header, a slice header, a tile group level, and a tile level.

13. The method of claim 1, wherein the plurality of second high-level control flags include flags indicating whether at least one of the following camera-captured content coding tools is enabled: extended intra prediction mode (EIPM), decoder side motion vector refinement (DMVR), bi-directional optical flow (BIO), ultimate motion vector expression for affine mode (affine UMVE), enhanced temporal motion vector prediction (ETMVP), sub-block based temporal motion vector prediction (subTMVP), chroma secondary transform, chroma intra prediction filtering, enhanced adaptive loop filtering (EALF), secondary prediction for affine mode, or improved intra prediction mode (IIP).

14. An apparatus for video decoding, comprising:
processing circuitry configured to
  decode coding information for a plurality of blocks from a coded video bitstream, the coding information indicating a first high-level control flag for the plurality of blocks, the first high-level control flag indicating whether a plurality of camera-captured content coding tools is disabled for at least one of the plurality of blocks, the at least one of the plurality of blocks including a current block;

in response to a determination that the first high-level control flag indicates that the plurality of camera-captured content coding tools are enabled, decode, from the coding information, a plurality of second high-level control flags, each of the second high-level control flags indicating whether a different one of the plurality of camera-captured content coding tools is enabled; and determine whether each of the plurality of camera-captured content coding tools is disabled for the at least one of the plurality of blocks based on the plurality of second high-level control flags;

in response to a determination that the first high-level control flag indicates that the plurality of camera-captured content coding tools are disabled, determine that all of the plurality of camera-captured content coding tools are disabled without dependency on the second high-level control flags; and reconstruct the current block based on the determination of whether each of the plurality of camera-captured content coding tools is disabled.

15. The apparatus of claim 14, wherein
the first high-level control flag indicates that the plurality of camera-captured content coding tools are enabled for the at least one of the plurality of blocks, and
the processing circuitry is configured to determine, for each of the plurality of camera-captured content coding tools, whether the respective camera-captured content coding tool is enabled for the at least one of the plurality of blocks based on a respective second high-level control flag for the respective camera-captured content coding tool.

16. The apparatus of claim 14, wherein
the plurality of camera-captured content coding tools are different from screen content coding (SCC) tools,
the first high-level control flag being a first value indicates that only the SCC tools are enabled for the at least one of the plurality of blocks and the camera-captured content coding tools are disabled for the at least one of the plurality of blocks, and
the first high-level control flag being a second value indicates that the camera-captured content coding tools and the SCC tools are enabled for the at least one of the plurality of blocks.

17. The apparatus of claim 14, wherein the processing circuitry is configured to:
determine, based on the first high-level control flag, a respective indicator for each of the plurality of camera-captured content coding tools that indicates whether the respective camera-captured content coding tool is enabled for the at least one of the plurality of blocks.

18. The apparatus of claim 14, wherein
the first high-level control flag is signaled in a sequence parameter set (SPS) for a video sequence and indicates whether the plurality of camera-captured content coding tools is disabled for the plurality of blocks in the video sequence, and
the processing circuitry is configured to determine that the plurality of camera-captured content coding tools is disabled for the plurality of blocks in the video sequence based on the first high-level control flag indicating that the plurality of camera-captured content coding tools is disabled for the plurality of blocks in the video sequence.

19. The apparatus of claim 14, wherein
the first high-level control flag is signaled in a picture header for a current picture and indicates whether the plurality of camera-captured content coding tools is disabled for the plurality of blocks in the current picture, and
the processing circuitry is configured to determine that the plurality of camera-captured content coding tools is disabled for the plurality of blocks in the current picture based on the first high-level control flag indicating that the plurality of camera-captured content coding tools is disabled for the plurality of blocks in the current picture.

20. The apparatus of claim 14, wherein the plurality of second high-level control flags include flags indicating whether at least one of the following camera-captured content coding tools is enabled: extended intra prediction mode (EIPM), decoder side motion vector refinement (DMVR), bi-directional optical flow (BIO), ultimate motion vector expression for affine mode (affine UMVE), enhanced temporal motion vector prediction (ETMVP), sub-block based temporal motion vector prediction (subTMVP), chroma secondary transform, chroma intra prediction filtering, enhanced adaptive loop filtering (EALF), secondary prediction for affine mode, or improved intra prediction mode (IIP).

\* \* \* \* \*